United States Patent [19]
Toomey et al.

[11] Patent Number: 6,119,147
[45] Date of Patent: Sep. 12, 2000

[54] METHOD AND SYSTEM FOR COMPUTER-MEDIATED, MULTI-MODAL, ASYNCHRONOUS MEETINGS IN A VIRTUAL SPACE

[75] Inventors: Lori Toomey, Sunnyvale; Lia Adams, Palo Alto, both of Calif.

[73] Assignees: Fuji Xerox Co., Ltd., Tokyo, Japan; Xerox Corporation, Stamford, Conn.

[21] Appl. No.: 09/123,518

[22] Filed: Jul. 28, 1998

[51] Int. Cl.[7] .................................................. G06F 13/00
[52] U.S. Cl. .................. 709/204; 709/205; 709/312; 709/329
[58] Field of Search .................................. 709/204, 205, 709/213, 217, 219, 312, 328, 329

[56] References Cited

U.S. PATENT DOCUMENTS

| | | | |
|---|---|---|---|
| 5,268,998 | 12/1993 | Simpson . | |
| 5,341,468 | 8/1994 | Shiraishi et al. . | |
| 5,491,743 | 2/1996 | Shiio et al. | 709/204 |
| 5,717,879 | 2/1998 | Moran et al. . | |
| 5,724,508 | 3/1998 | Harple, Jr. et al. | 709/205 |
| 5,793,365 | 8/1998 | Tang et al. | 345/329 |
| 5,826,025 | 10/1998 | Gramlich | 709/217 |
| 5,911,045 | 6/1999 | Leyba et al. | 709/204 |
| 5,956,038 | 9/1999 | Rekimoto | 345/419 |
| 5,999,208 | 12/1999 | McNerney et al. | 348/15 |

OTHER PUBLICATIONS

T. Moran, et al., *Envoluntionary Engagement in an Ongoing Collaborative Work Process: A Case Study, Xerox Palo Alto Research Center*, Xerox Palo Alto Research Center, Palo Alto, CA, pp. 150–159, Computer Supported Cooperative Work '96, Cambridge, MA, 1996.

S. Minneman et al., *A Confederation of Tools for Capturing and Accessing Collaborative Activity*, Xerox Palo Alto Research Center, Palo Alto, CA, Multimedia '95, San Francisco, CA, pp. 523–534.

P. Curtis et al., *MUDs Grow Up: Social Virtual Reality in the Real World*, IEEE, 1994, pp. 193–200.

E. Isaacs et al., *Piazza: A Desktop Environment Supporting Impromptu and Planned Interactions*, Computer Supported Cooperative Work '96, Cambridge, MA, 1996, Sun Microsystems Inc., pp. 315–324.

H. Ishii et al., *Tangible Bits: Towards Seamless Interfaces between People, Bits and Atoms*, CHI 97, Atlanta, GA, 1997, pp. 234–241.

W. Edwards et al., *Timewrap: Techniques for Autonomous Collaboration*, CHI 97, Atlanta, GA, 1997, pp. 218–225.

N. Manohar et al., *The Session Capture and Replay Paradigm for Asynchronous Collaboration*, Department of Electrical Engineering and Computer Science, University of Michigan, Ann Arbor, MI, Sep. 10–14, Stockholm, Sweden, 1995, pp. 149–164.

V. O'Day et al., *The Social–Technical Design Circle*, Computer Supported Cooperative Work '96, Cambridge, MA, 1996, ACM, pp. 160–169.

(List continued on next page.)

*Primary Examiner*—Viet D. Vu
*Attorney, Agent, or Firm*—Oliff & Berridge, PLC

[57] ABSTRACT

A computer-supported collaborative work environment allows for computer-mediated, multi-modal, asynchronous meetings in a virtual space that enables, recording, reviewing and augmenting meetings that take place in the virtual environment. Meeting participants interact via avatars, i.e., graphical representations of the participants, in a place-based, multi-dimensional graphical environment. Meeting sessions are captured for future replay and augmentation in a multi-modal document. The system utilizes multiple "tracks" in the multi-modal document, such as text discussion, audio commands, graphics, and documents, which are combined into the multi-modal document to preserve a recording of the meeting for future participants. The multi-modal document of this meeting can then be replayed and augmented by future participants ad infinitum to create a single, synchronous meeting. Furthermore, using avatars enables a straightforward method for generating composite screens for multiple sessions, and alleviates privacy concerns of users.

22 Claims, 33 Drawing Sheets

OTHER PUBLICATIONS

I. Pandzic et al., *A Flexible Architecture for Virtual Humans in Networked Collaborative Virtural Environments*, The Eurographics '97, 1997, vol. 16 (1997), No. 3.

M. Roseman et al., *TeamRooms: Network Places for Collaboration*, Computer Supported Cooperative Work '96, Cambridge, MA, 1996, ACM, pp. 325–333.

N. Manohar et al., *Replay by Re–execution: A Paradigm for Asynchronous Collaboration via Record and Replay of Interactive Multimedia Session*, SIGOIS Bulletin, Dec. 1994, vol. 15., No. 2.

R. Lea et al., *Virtual Society: Collaboration in 3D Spaces on the Internet*, Computer Supported Cooperative Work: The Journal of Collaborative Computing 6; Jul., 31, 1996, pp. 227–250.

E. Pedersen et al., *Tivoli: An Electronic Whiteboard for Informal Workgroup Meetings*, INTERCHI '93, Apr. 1993, pp. 391–398.

E. Pedersen et al., *AROMA: Abstract Representation of Presence support Mutual Awareness*, Dept. of Computer Science, Communication and Educational Research, Roskilde University, Roskilde, Denmark, 1997, pp. 1–16.

P. Dourish et al., *Portholes: Supporting Awareness in a Distributed Work Group*, CHI '92, 1992, pp. 541–547.

R. Evard, *Collaborative Networked Communication: MUDs as Systems Tools*, 1993 LISA, Nov. 1–5, 1993, pp. 1–8.

A. Bruckman et al., *Construction and Professional Community*, Convergence 1995, vol. 1, No. 1, pp. 94–109.

G. Abowd et al., *Classroom 2000: Enhancing Classroom Interaction and Review*, GVC Center, College of Computing, Office of Information Technology & EduTechn Institute, Georgia Institute of Technology, Atlanta, GA, 1996, pp. 1–9.

S. Minneman et al., Where Were We: making and using near–synchronous, pre–narrative video, ACM Multimedia 93, 1993, pp. 207–214.

I. Pandzic et al., *A flexible architecture for Virtual Humans in Networked Collaborative Virtual Environments*, 1997 Eurographics '97.

FIG. 5

| thr | time | text |
|---|---|---|
| 1 | 9:19 | * Elizabeth arrives in the Meeting Room * |
| 1 | 9:19 | Les: )cheer |
| 1 | 9:20 | Les: Welcome!  1160 |
| 1 | 9:20 | Les: have you been trained on LiveBoard software? There's an instructor visiting next week. |
| 1 | 9:21 | Elizabeth: Where and when? |
| 1 | 9:22 | Les: Here are the details.  1220 |
| 1 | 9:22 | Les: I hope they teach how to do object embedding on the LiveBoardS |
| 2 | 2:15 | Lia: Didn't you take the training already, Lori? What did you think? |
| 2 | 2:16 | Lori: Yes, I took it last month. I thought it was useful. And yes, Les, they DO cover object embedding. |
| 2 | 2:17 | Lia: )yawn |
| 2 | 2:17 | Lia: Object embedding sounds boring. |
| 2 | 2:18 | Lori: If you plan to make use of the LiveBoard, I recommend taking the course. |
| 1 | 9:23 | Les: Okay, next item. |
| 1 | 9:24 | Elizabeth: Has everyone had a chance to look at the CSCW program? We need to register soon. |
| 2 | 2:21 | Lia: LoadBrowser http://www.acm.org/conferences/cscw96.html |
| 2 | 2:22 | Lori: Shall we look at the program now and figure out how to divide up the sessions? |
| 2 | 2:24 | Lia: Good idea! |
| 2 | 2:26 | I'll be back later; bye! |
| 2 | 2:27 | * Lia leaves the Meeting Room * |

Meeting Agenda

Date-November 8, 1996
Time-3:15
Location-FXPalace, Kumo
Purpose-The weekly meeting of the Digital Workplaces team.

Topics for Discussion
1. Interesting talk at PARC
2. LiveBoard training next week
3. CSCW conference coming up
   - Who will attend?

Attendees
- Les Nelson
- Elizabeth Churchill

FIG. 13

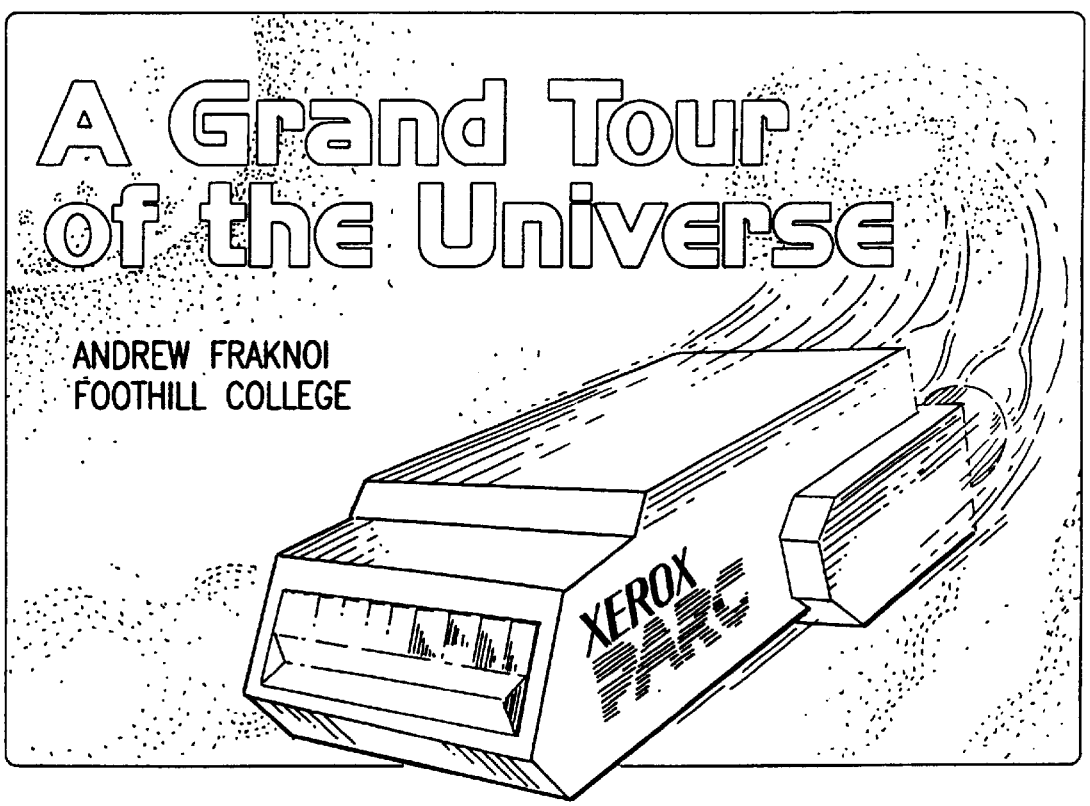

In this talk, astronomer Andrew Fraknoi takes the audience on a tour of the universe, starting with the planets and moons in our own solar system, out into the star clouds of the Milky Way, and then into the distant realm of the galaxies. Stops along the way include: the grand canyon of Mars, the eerie sulfur volcanoes of Io, and the great rings of Saturn. The talk is illustrated with beautiful color slides from the world's largest telescopes, from space probes that have explored the planets, and from the Hubble space telescope. No background in science or math will be assumed and the talk is appropriate for the whole family.

Andrew Fraknoi is the Chair of the Astronomy Department at Foothill College and Educational Consultant for the Astonomical Society of the Pacific. Before coming to Foothill in 1992, he

FIG. 14

CSCW 96
Computer Supported Cooperative Work

November 16-20, 1996
Boston, Massachusetts, USA
*"Cooperating Communities"*

Sponsored by the ACM Special Interest Groups on Computer-Human Interaction(SIGCHI) and Office Information Systems(SIGOIS)

---

Program | Conference Registration | Conference at a Glance | Critical Dates | Corporate Sponsors | What's New | More Information

---

Note: The last day to advance register is Thursday, November 7!
And although the deadline has passed, some hotel rooms at the conference rate may still be available.

Program

- Welcome
- Conference at a Glance
- Critical Dates
- Workshops (Saturday, November 16)
- Doctoral Colloqium
- Tutorials (most on Sunday, November 17)
- Videos
- Technical Program
  - Monday, November 18
  - Tuesday, November 19 (including Demonstrations)
  - Wednesday, November 20
- Conference Information
- Conference Registration (registration form available here)
- Hotel Registration
- Committees
- Related Organizations

FIG. 15

Meeting Agenda

Date-November 8, 1996
Time-3:15
Location-FXPalace, Kumo
Purpose-The weekly meeting of the Digital Workplaces team.

Topics for Discussion
1. Interesting talk at PARC
2. *LiveBoard training next week*
3. CSCW conference coming up
   - Who will attend?

Attendees
- Les Nelson
- Elizabeth Churchill
- Lori Toomey
- Lia Adams

METHOD AND SYSTEM FOR COMPUTER-MEDIATED, MULTI-MODAL, ASYNCHRONOUS MEETINGS IN A VIRTUAL SPACE

BACKGROUND OF THE INVENTION

1. Field of Invention

This invention is related to a computer-supported collaborative work environment. In particular, this invention is directed to a method and system for computer-mediated, multi-modal, asynchronous meetings in a virtual space that provides for enabling, reviewing and augmenting meetings that take place in a virtual environment.

2. Description of Related Art

As more organizations become globally distributed, and network infrastructures enable practices such as telecommuting, there is an increasing need for an alternative to face-to-face meetings. While existing technologies such as video conferencing and teleconferencing address this issue to some extent, each has its individual shortcomings. Traditional teleconferencing systems are expensive, and are generally not well suited for rapid, impromptu discussions. Newer desktop teleconferencing systems address these concerns, but privacy issues often hinder user acceptance of systems that transmit real-time video or live photographic images of the participants. More importantly, these techniques require synchronous participation, i.e., all participants must be available to meet at the same time. This type of coordination can be particularly difficult when a work group is spread throughout the world across multiple time zones.

SUMMARY OF THE INVENTION

While sessions in video conferencing and teleconferencing systems may be captured for later playback, viewers of the played-back sessions are observers, not participants. Annotation tools for the played back session are the first step to supporting participation. However, in current systems which implement playback, the annotations remain distinct from the original session since the annotations are appended to the end of the previous session, e.g., they are not integrated into a single synchronous session.

The system and method of this invention provide a medium for meetings which takes place in a virtual environment.

The system and method of this invention provide a virtual environment that enables a set of participants, which are not required to be collocated, to meet and interact synchronously or asynchronously.

The invention provides a system and method for enabling, reviewing and augmenting meetings that take place in a virtual environment.

Meeting participants interact via avatars, i.e., graphical representations of the participants, in a place-based, multi-dimensional graphical environment. Meeting sessions are captured for future replay and augmentation in a multi-modal document. The system utilizes multiple "tracks" in the multi-modal document, such as text discussion, audio commands, graphics, and documents, which are combined into the multi-modal document to preserve a recording of the meeting for future participants. The multi-modal document of this meeting can then be replayed and augmented by future participants ad infinitum to create a single, integrated meeting. Furthermore, the use of avatars enables a straightforward method for generating composite screens that incorporate activities that take place over multiple sessions, and alleviates privacy concerns of users.

Since interaction occurs over a computer network, it is not necessary for participants to be in the same location. Furthermore, participants need not "meet" at the same time. In addition to supporting real-time communication between participants who are not physically located together, i.e., co-located, interactions that take place in the virtual environment are captured electronically. These captured interactions persist and may be reviewed and augmented by others who "attend" the meeting at a later time.

Interactions can be brief and informal, such as, for example, one person asking another a quick question, while other interactions may be more structured, having a scheduled time and agenda. These sessions are captured by the system and method of this invention, and are then available to others for asynchronous viewing or participation. Subsequent attendees to a recorded session can play back the events and see themselves interacting with prior attendees as they add their contributions. Thus, subsequent attendees have a greater sense of participation and group membership than if they were merely reviewing the previous interactions of others.

The subsequent attendees' interactions are inserted into the captured record of the session, and subsequent participants will view the new contributions intermingled with the earlier material. This provides an integrated meeting which additional subsequent attendees can then play back and further augment, if necessary.

Since usage is not restricted to occasional asynchronous meetings, users need not remember special, infrequently used commands and gestures. Furthermore, since the system and method of this invention can become part of the normal desktop environment, there is no additional cost to set up an asynchronous meeting environment. Additionally, frequent synchronous interactions with colleagues' avatars help those avatars to become very familiar, making asynchronous interactions with those avatars, which can be located in the same virtual space, feel more natural.

The virtual environment that permits both synchronous and asynchronous participation is a multi-dimensional, place-based system in which participants have discussions using avatars that emit "cartoon bubbles" containing the text of their utterances. In such a place-based system, there are multiple "rooms" in which participants may gather, and the events, for example, a discussion, which take place in a room are experienced only by those participants "present" in that particular "room." To enhance these discussions, participants may also convey emotional expressions, e.g., confusion, dissatisfaction, etc., by using different avatars or by using a "paint" tool to draw question marks, etc.

Supplementing the discussions are documents such as meeting agendas, idea lists which could be generated during brainstorming sessions, proposals and design documents which are shared via commands that update each user's interface. These task-related documents play important roles in helping to coordinate the efforts of the participants. Additionally, specialized rooms enable activities such as voting with "tokens" and drawing on a shared whiteboard.

All events that take place during a meeting in accordance with the system and method of this invention are captured for playback and for potential further augmentation. Rather than reading a simple textual summary of what took place, later attendees to the session may play back the actual meeting and observe the decision-making process. This playback process includes seeing each participant's avatar "speak" and change expressions, while watching the surrounding context of documents and whiteboard drawings change as the meeting progresses. Additionally, users may "insert" themselves into the session by adding their own contributions, which provides a better sense of participation, as opposed to mere observation. These additions to the meetings are merged into the meeting document and will be included in subsequent playbacks.

The use of replay is an emerging area in computer supported cooperative work. However, the system and method of this invention allow previously passive reviewers to become active participants in events that have already taken place, by inserting them into previously recorded sessions. Furthermore, unlike the related art systems, in which a user may only review an earlier session, the system and method of this invention support multiple users that can review and augment sessions simultaneously. Since the system and method of this invention use simple graphic images for the avatars and the scenes, i.e., rooms, creating a composite scene in which avatars of current meeting participants are inserted into earlier scenes is straightforward. This compositing process is much easier than is possible using video. With video, considerable effort is required to merge multiple sources of video images into a composite so that selected portions from one source would appear in another. Furthermore, using graphical avatars also eliminates privacy issues associated with video conferencing.

As subsequent sessions occur, and to avoid confusion over which participants in a composite scene are "live" and which have been recorded earlier, the system and method of this invention can use different appearances for the recorded and live participants. Furthermore, numerical tags that explicitly identify the session at which the participant was present, and can also located near the avatar.

Integrating collaborative tools, such as shared whiteboards and editors, with the facilities for synchronous and asynchronous meetings, and with avatars in a virtual environment, makes the text/graphics-based system and method for awareness and collaboration among distributed workgroups according to this invention more versatile, user friendly, comprehensive and productive.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein:

FIG. 5 is a second exemplary graphical user interface screen displayed during the course of a meeting according to the asynchronous meeting system of this invention;

FIG. 12 is an exemplary text log according to the asynchronous meeting system of this invention;

FIG. 13 is an exemplary graphical user interface screen displaying a meeting agenda during a meeting according to the asynchronous meeting system of this invention;

FIG. 14 is an exemplary graphical user interface screen displaying data accessed using a browser during a meeting according to the asynchronous meeting system of this invention;

FIG. 15 is an exemplary graphical user interface screen displaying data accessed using a browser during a meeting according to the asynchronous meeting system of this invention;

FIG. 22 is an exemplary graphical user interface screen displaying the exemplary agenda updated as the meeting progresses through the second instance in according to the asynchronous meeting system of this invention;

FIGS. 23–27 are further representative graphical user interface screens of the exemplary meeting displayed in accordance with the first instance of the meeting of FIGS. 8–11 according to the asynchronous meeting system of this invention;

DETAILED DESCRIPTION OF PREFERRED EMBODIMENTS

Figure 1:
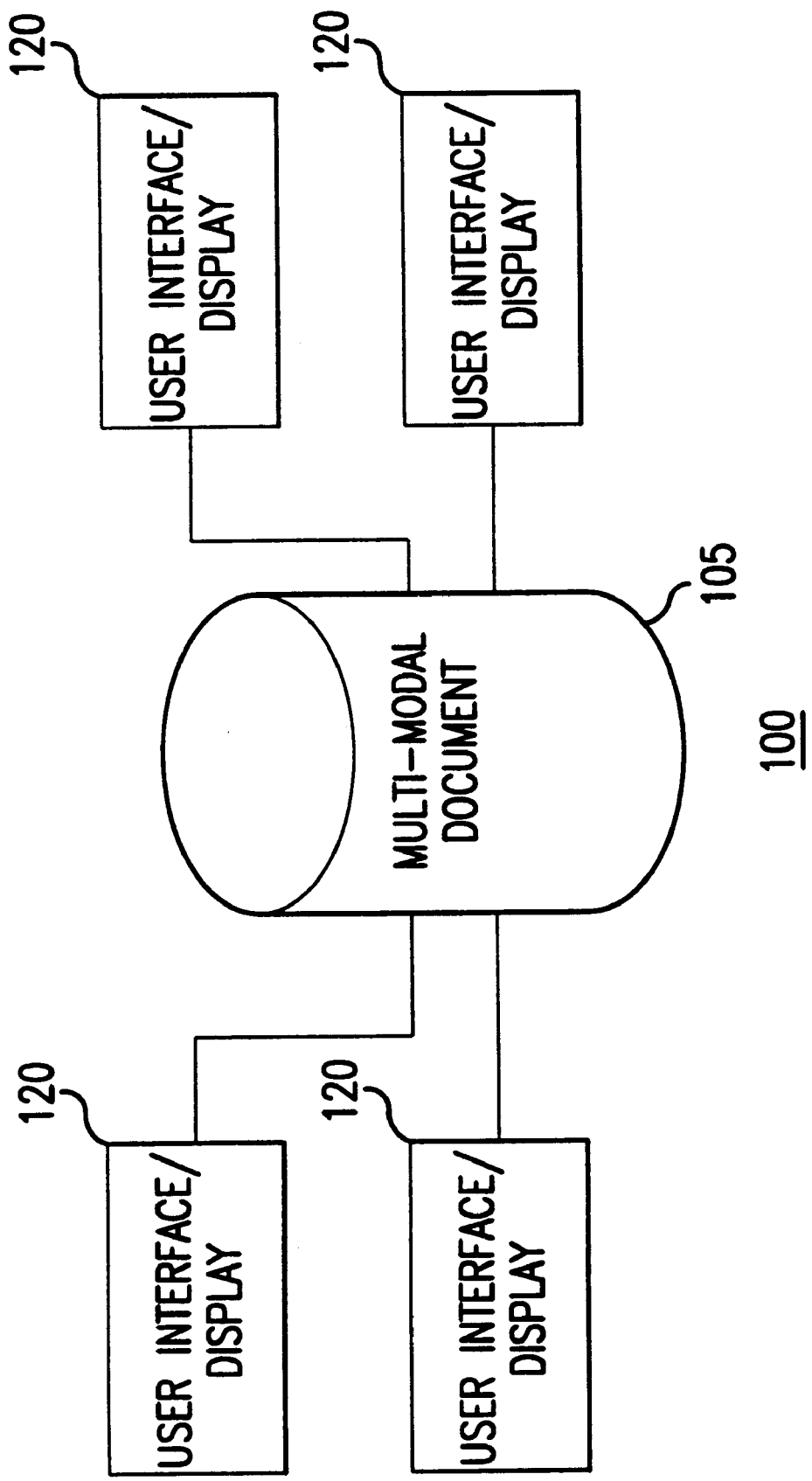
FIG. 1 is a functional block diagram of an asynchronous meeting system according to this invention.

FIG. 1 shows one embodiment of a computer-mediated, multi-modal, asynchronous meeting system 100 according to this invention. The system 100 includes a multi-modal document 105, and a number of user interfaces and displays 120. Each of the user interfaces and displays 120 are connected to the document 105. Each user interface and display 120 allows a user, who may be remotely located in space and/or time from the other users, to interact asynchronously with the document 105 relative to one or more of the other users. As the users interact with the document 105 through the user interfaces 120, asynchronous meetings in a virtual space can be created and recorded. One of the users plays the role of moderator of the meeting.

The multi-modal document 105 is a data structure stored in a memory capable of recording all aspects of an asynchronous meeting. Specifically, commonly-stored data structures include text discussions, audio commands, graphics, documents and agendas. When these and other data structures are combined into the multi-modal document 105, the multi-modal document 105 provides a complete context of a meeting for subsequent participants.

Figure 2:
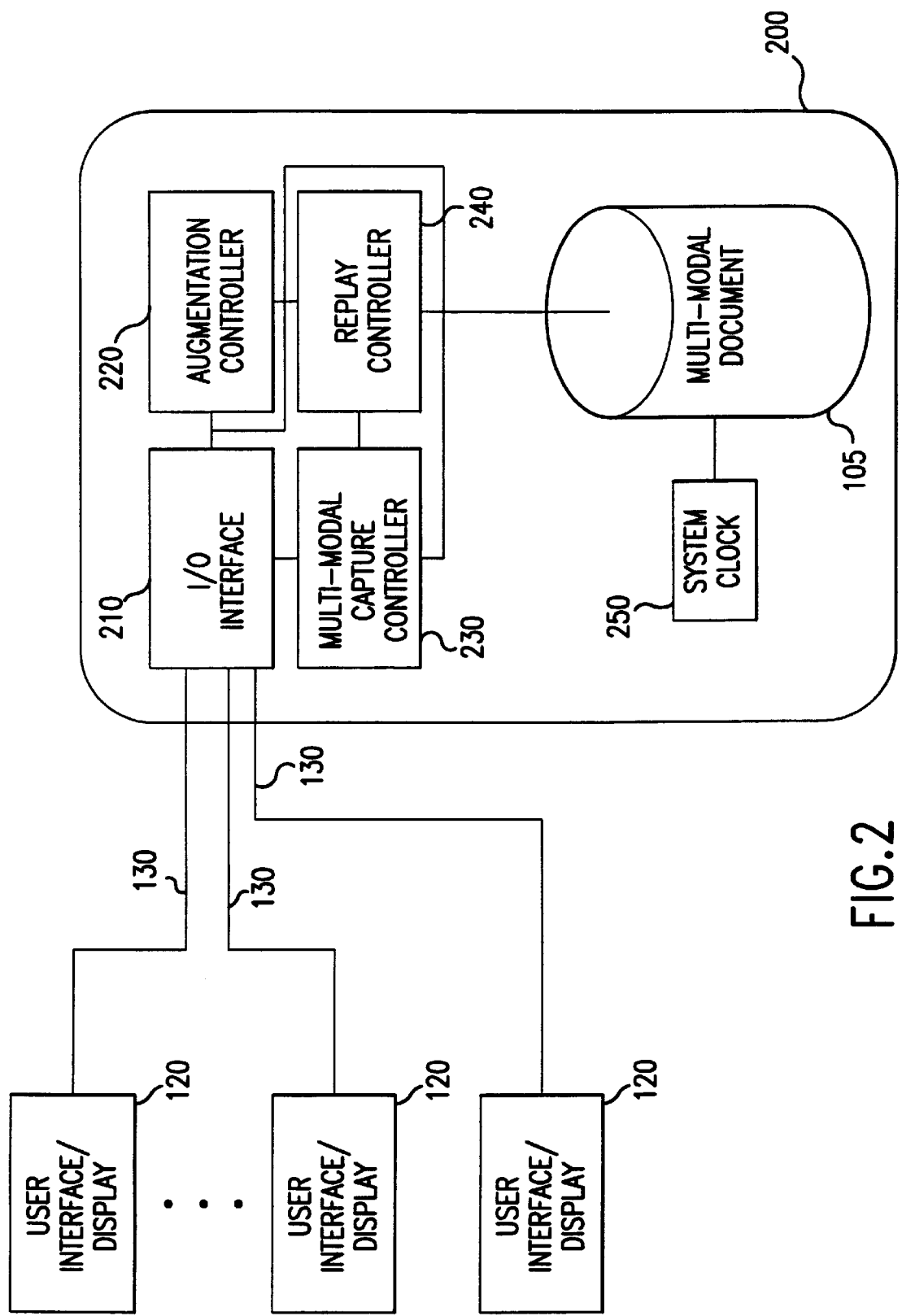
FIG. 2 is a functional block diagram showing the asynchronous meeting system of FIG. 1 in greater detail.

FIG. 2 shows a general purpose computer 200, such as a server, used to implement the system 100 shown in FIG. 1. In general, the various user interfaces 120, i.e. clients, and general purpose computer 200 can be implemented on a conventional client-server architecture. In particular, the general purpose computer or server 200 includes the multi-modal document 105, an input/output interface 210, an augmentation controller 220, a multi-modal capture controller 230, a replay controller 240 and a system clock 250. The multi-mode capture controller 230, augmentation controller 220 and replay controller 240 provide data inputs to and/or receive data outputs from the multi-modal document 105. The user interfaces/displays 120 are connected to the general purpose computer 200 implementing the asynchronous meeting system 100 through the links 130 and the I/O interface 210. The meeting participants interact with each other through the user interface/displays 120. The meeting participants' inputs and displays are routed from their particular user interface/display 120 through the I/O interface 210 and the appropriate one or ones of the controllers 220–240, depending on whether the asynchronous meeting system 100 is capturing a meeting, augmenting a previously captured meeting or replaying a meeting.

The multi-mode capture controller 230, augmentation controller 220, and replay controller 240 are arranged so that the meeting participants can record, replay or augment either a meeting which is in progress or a previously-recorded meeting.

The system clock 250, which is connected to the multi-modal document 105, time-stamps the meeting participants' interactions that are saved within the multi-modal document 105. This allows for the later replaying of meeting events in the correct order. Specifically, the system clock associates two "time stamps" with each user interaction. The first time stamp is a "real" time stamp that records the actual time of the interaction. The second time stamp is used to record and preserve the order of the participant's interactions in an augmented session. The use of the two time stamps will be described below as the meeting replay options are discussed.

To enable capturing, replaying or augmenting a meeting captured in the multi-modal document 105, one embodiment of the asynchronous meeting system 100 uses a client-server architecture in which the meeting is actually "conducted," with the server programmed to capture and store the meeting events as they occur. The meeting events are captured, i.e., recorded, into the multi-modal document 105. This multi-modal document 105 includes several tracks of information, including text inputs, audio cues, such as, for example, prerecorded sound files, graphic representations of participants, such as, for example, avatars, props, the scene, such as, for example, the room and the background, documents created or provided by the participants and whiteboard drawings created by the participants. Capturing the meeting involves time-stamping and recording the meeting events, where each event is a change to one or more of these tracks.

Time-stamping provides two functions. First, the time-stamp allows the event, i.e., the user interaction, to be recorded with the actual date and time. Second, the time-stamp acts as a number that is appended to the event indicating the position in the sequence of events forming the meeting.

Figure 3:
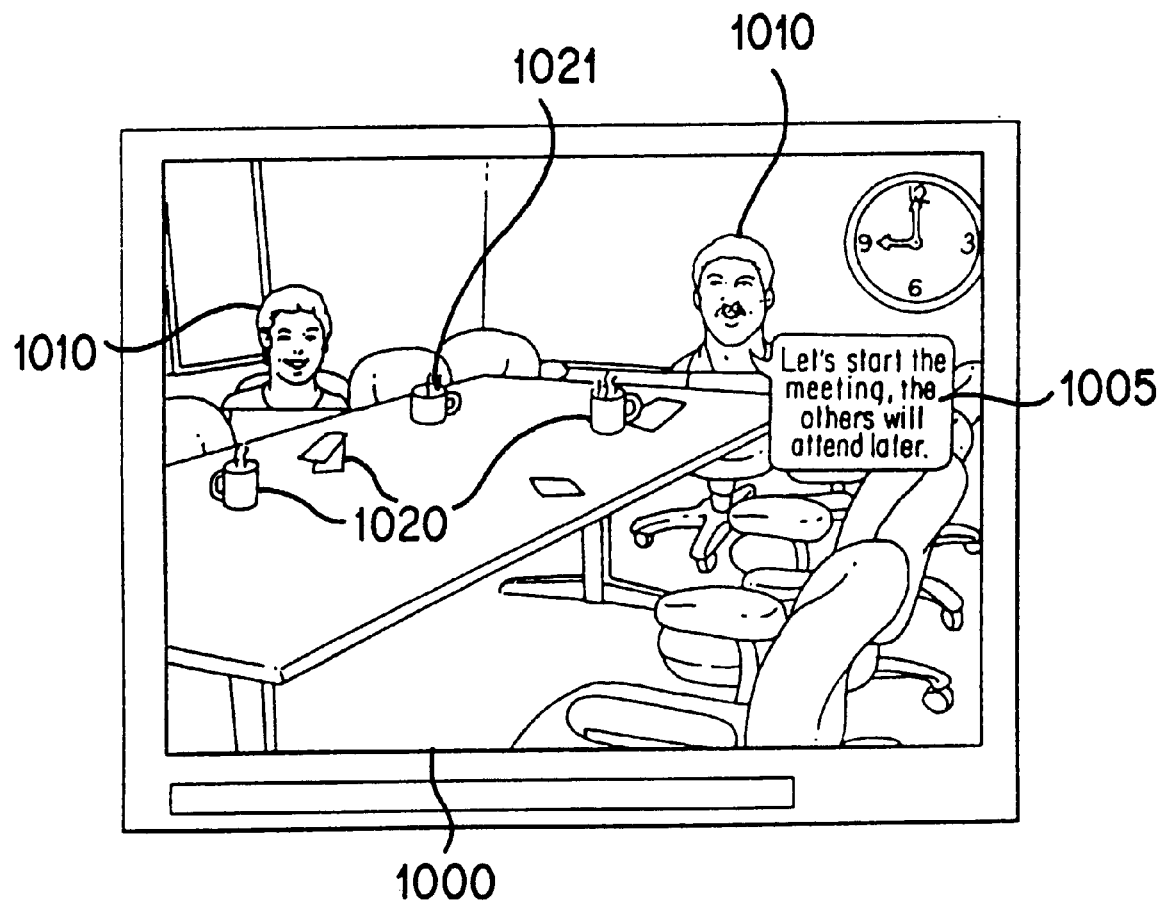
FIG. 3 shows a typical virtual environment of the asynchronous meeting system according to this invention.

FIG. 3 shows a virtual environment in operation, the computer-mediated, multi-modal, asynchronous meeting according to the system and method of this invention begins in a virtual space. A moderator composes or selects a desired virtual environment, usually from a predefined set of scene templates. As shown in FIG. 3, the virtual environment generally includes a setting in which the meeting participants place their avatars, such as, for example, a conference room. However, it should be appreciated that any virtual environment can be created to meet the participants' needs.

During the initial session of a meeting, each user runs an instance of a client software program according to this invention to join the others in the virtual space. Events from the clients are received by the server, and placed in a queue. The server takes each event off the queue and processes it. For each event, the server can identify the user and extract the time, the event type, and some event content. These events include such inputs from the users as text utterances, sound cues, room appearance changes, avatar changes, avatar position changes, prop appearances and changes, prop position changes, browser loads, and whiteboard markings.

A text utterance is an event that contains a text string. During the meeting, as shown in FIG. 3, each utterance 1005 is displayed by the appropriate user's interface as a cartoon-style balloon emanating from that user's avatar. The text of the utterance is saved, along with its associated user identity and time stamp, in the multi-modal document 105.

A sound cue is a prerecorded sound. As a sound cue is submitted by a user, the server records the user, the time, the identification of the particular event and a cyclic redundancy check of a sound file serving the sound cue. The server then maintains a copy of each sound file used in the multi-modal document 105. When a sound file is needed, the client downloads the sound file from the server, caches the sound file and plays the sound file. Similar upload-on-demand operations are performed by the server whenever a new sound file, prop description, avatar description, or virtual environment background file is referred to in an event.

The virtual environment 1000 shown in FIG. 3, i.e., the room environment, is the room which is occupied by the moderator when a meeting begins. A room description event is sent from the client, in this case the moderator's client, to the server. The room description event includes the room name of the virtual environment 1000, the name of a graphics file corresponding to the actual scene of the virtual environment, i.e., the room, the client identification and the time. The server then saves the name and identification of the graphics file and the client identification and assigns it a time stamp and cyclic redundancy check. During the meeting, each user entering the room will see the graphical background shown in FIG. 3 and described by the room description event.

This system of including and versioning the files, sounds and/or graphics as they are used guarantees that a user or client can download a stored meeting and then revisit it, even if the user is revisiting it while running on a client machine that is disconnected from the network.

The avatars 1010 are graphical representations of the meeting participants. The avatars 1010 can be created by a user, or the user can select from a predefined set of characters. Furthermore, one or more components of an avatar 1010 may be animated. When a user first appears, or if a user changes his/her avatar's appearance, the client sends a user appearance event to the server. This event includes the client identification, the time, the corresponding graphics file storing the new avatar appearance, cyclic redundancy checks for the list of components of the avatar 1010, a size of the array, that generally defines how many graphics files are overlaid to create a single avatar image and the X and Y position of the avatar within the virtual environment 1000. Specifically, by overlaying multiple graphics files, more complex avatars can be achieved. Furthermore, overlaying multiple graphic files allows users to modify their avatar without actually altering the "base" avatar image to, for example, convey emotions. As with sounds and room graphics, if the name, identification, or cyclic redundancy check indicates that the server does not have an up-to-date copy of the graphics file for the avatar 1010, the server makes a separate request to the client to upload the necessary files and generates a component identification for the graphics file. Therefore, during the meeting, when a user changes the appearance of the user's avatar 1010, all users will see the updated appearance. The server saves for each participant, the array of component identifications, client identifications, time, and the positions of the avatars after each event.

The user position defines the location of the user's avatar 1010 in the virtual environment 1000. When a user moves his/her avatar within the virtual environment, the client sends a user position event, containing the client identification, the time, and the new position of the avatar within the virtual environment to the server. This information is then saved in the multi-modal document 105.

Props 1020 are other items that are movable about the virtual environment 1000. Like avatar components, the props 1020 can be introduced into a virtual environment 1000 and moved around it. When a prop 1020, such as, for example, a coffee cup 1021, or notes 1022 shown in FIG. 3, first appears, or if a prop 1020 changes its appearance, the client sends a prop appearance event, including the client ID, the time, the graphics file name, identifications and a cyclic redundancy check for the graphics file, and the position of the prop within the virtual environment. As with sounds and room graphics, if the name, identification or cyclic redundancy check indicates that the server does not have an up-to-date copy of the graphics file storing the prop 1020, the server makes a separate request to the appropriate client to upload the graphics file for that prop 1020. The server then generates a prop identification for that prop 1020. The system then saves the prop identification, client identification, time and position.

When a prop 1020 is moved within a virtual environment 1000, the client sends a prop position event, containing the client identification, the time and the new position of the prop 1020 within the virtual environment 1000. During the meeting, each user sees the prop 1020 move to the new position in the virtual environment 1000. The server saves the prop identification, client identification, time and the new position of the prop 1020 in the multi-modal document.

Figure 4:
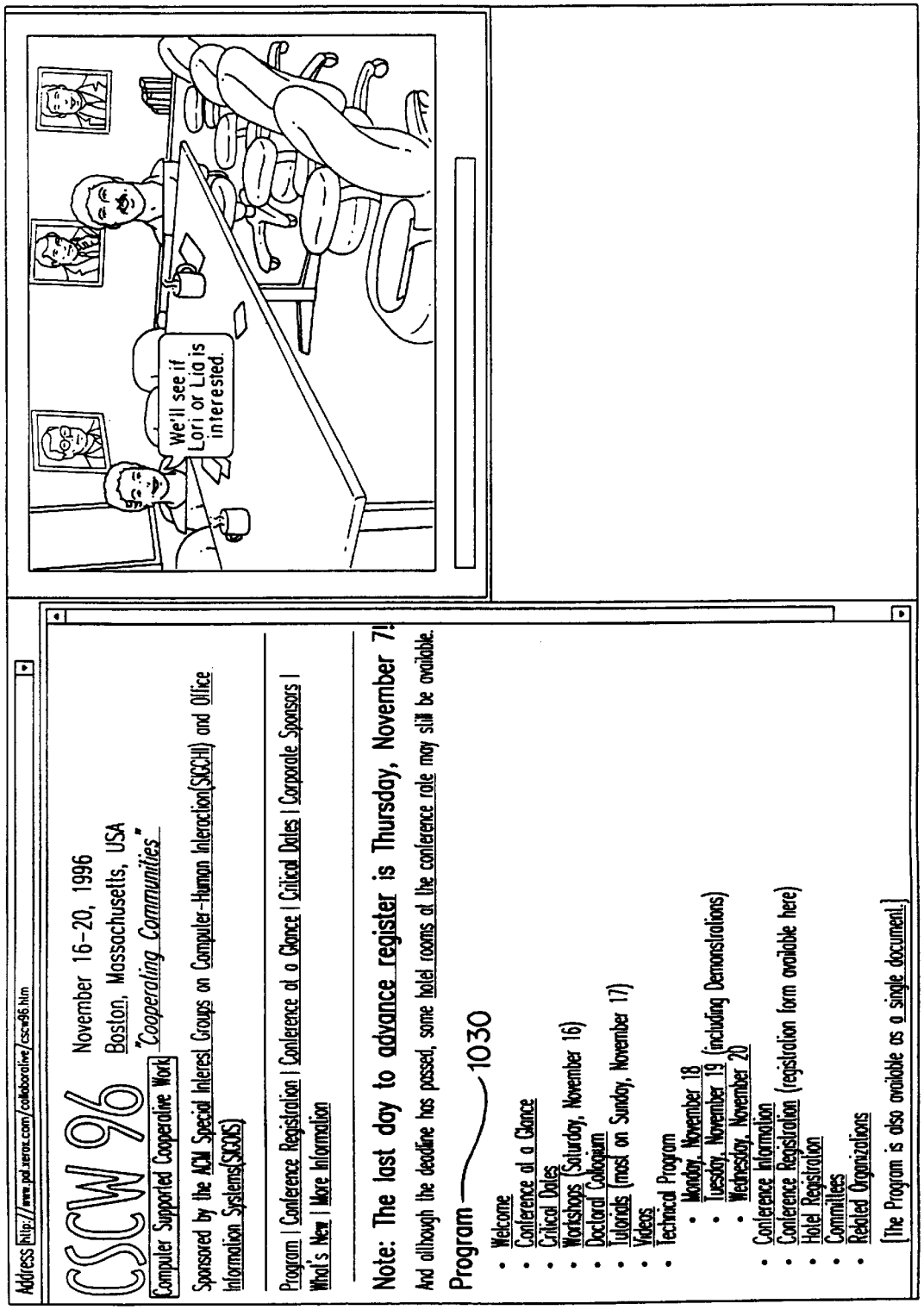
FIG. 4 is a first exemplary graphical user interface screen displayed during the course of a meeting according to the asynchronous meeting system of this invention.

FIG. 4 shows a browser. A browser load command is used in conjunction with a browser or similar display interface. When a client sends a browser load command, this event includes a text string, such as the uniform resource locator (URL), or address, of the data to be loaded, plus the client identification and the time. During the meeting, and in the case of the World Wide Web document 1030 shown in FIG. 4, the page is loaded into each user's graphical user interface.

Figure 5:
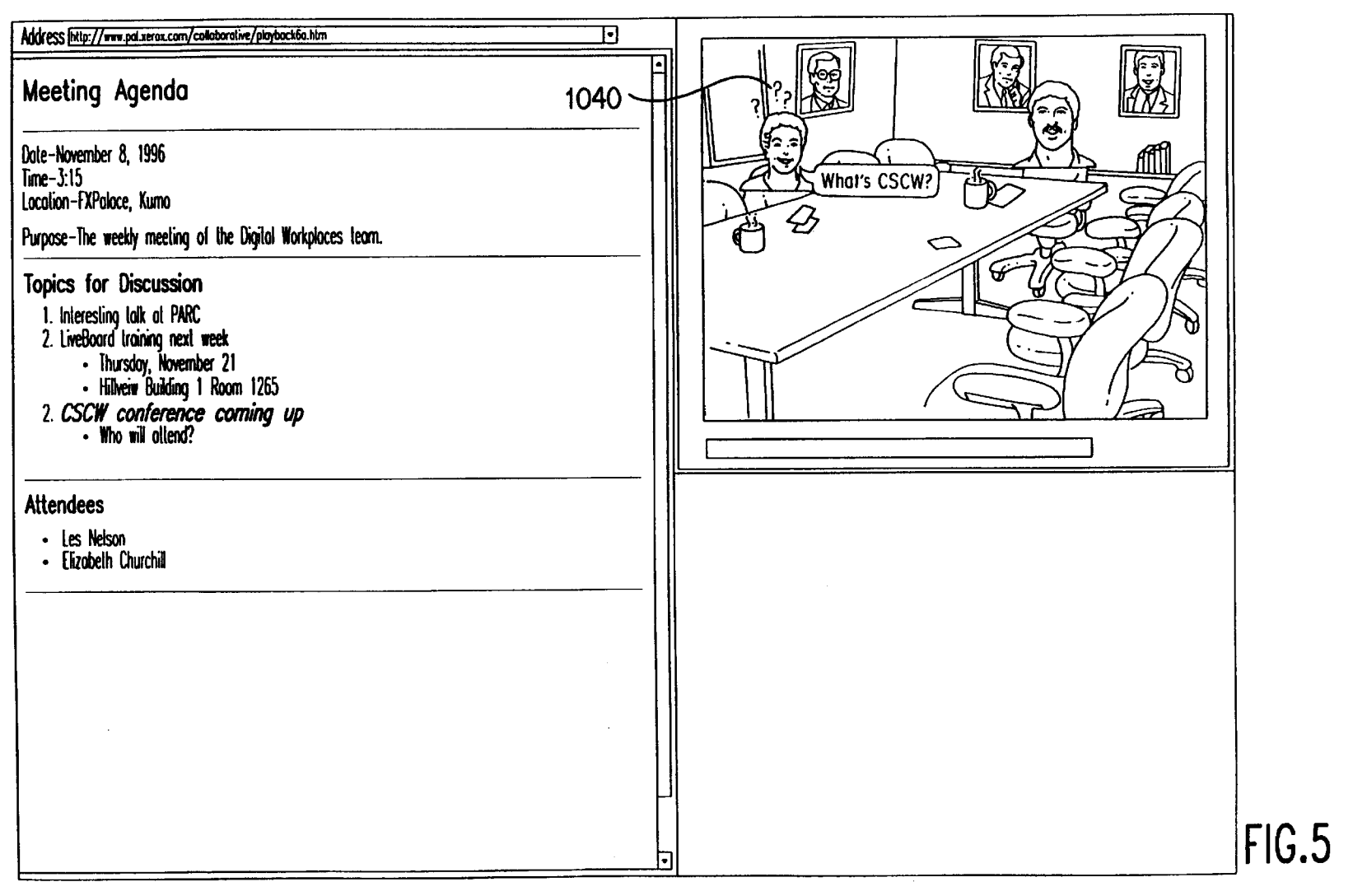

FIG. 5 shows an exemplary paint stroke 1040. Pen or paint strokes, and the complementary eraser stroke, are "drawings" performed by a user anywhere in the virtual space 1000. All aspects of the stroke 1040, such as placement, color, width and direction, are determined by the user. When a user makes a paint stroke or eraser stroke on a shared whiteboard, or anywhere in the virtual environment 1000, the client sends stroke information, including the color, pen width, and the locus of points defining the stroke 1040, along with the time and identification to the server. The server saves the time, the client identification, and the stroke information along with the information pertaining to the beginning and end points of the stroke. This information allows the server to replay the stroke 1040 later in the correct direction.

Once a meeting has been recorded, there are at least two possible ways to revisit a meeting that has been captured by the asynchronous meeting system 100 according to this invention. In a sequential mode, a user can replay a meeting starting at the beginning and proceed according to one of the two time stamps defined above, the actual clock time or the logical, or event, time. In a random access mode, a user can leap into the middle of an already-recorded meeting.

In the sequential mode, the recorded meeting is replayed beginning at the start of the meeting by the moderator. Actual clock time ordering allows a user to replay the meeting in the actual real-time order the events occurred. For logical time ordering, the server organizes the meeting events so the meeting appears to have been conducted synchronously.

In the random access mode, users wishing to skip directly to specific events or sections of the recorded meeting may do so using either of two meeting summaries that function as navigation tools. Users specify whether they wish these summaries to be presented in chronological order based on the real clock time stamps, or in logical order based on the event time stamps. Logical order refers to the order of the event time stamps, which includes events inserted during augmentation of the asynchronous meeting.

With either access mode, the user is presented with a plurality of summary screens which link a particular action, event, text utterance or the like to the associated location in the meeting where the event occurred.

FIG. 12 shows a textual log, or summary 1045 of the discussion and sound logs. Each entry in the log 1045 is a link that initiates playback of the recorded meeting from the point corresponding to the selected entry.

This view thus supports two crucial processes: an overview of the meeting, that can be scanned quickly, supporting both browse and search goals, and direct access to points of interest, enabling meeting segments to be replayed on the basis of particular interest. Thus, if a first user is reconstructing a meeting between other group members, and is particularly interested in an agenda item relating to conferences, the user is able to go straight to the point at which that agenda item was discussed, because the summary clearly shows when the documents for the conference, for example, were introduced. Similarly, if a group member was browsing and was interested in points made by a certain person on a certain topic, the summary clearly shows when participants are speaking and what documents are visible at the time. In this simple example, the virtual environment 1000 differs only slightly over the course of the meeting. In a real meeting, people may enter and leave the room, change their positions as they change their roles, and the meeting itself may change venue.

Therefore, for participants replaying the meeting for the first time in order to offer comments, a number of points of access are offered and the summary review facilitates an understanding of the structure of the meeting and discussions during the meeting. For participants who are reviewing the meeting to see what changes have occurred since their previous interaction, the summary enables quick and meaningful reconstruction.

Replaying a recorded meeting from the start is straightforward using either event ordering. The server simply sorts the events in the desired order and replays them. The state of the virtual environment 1000, the props 1020, and the avatars 1010 will be restored to the states they were in when the selected event first happened.

However, in order to visit the meeting by starting from a particular point part-way through the meeting, the system needs to be able to reconstruct the graphical state of the meeting. Specifically, the presence and appearance of the avatars 1010, the presence and appearance of the props 1020, the appearance of the virtual environment 1000 and the contents of any shared browsers must be re-integrated. Since text utterances 1005 and sounds tend to occupy only a short period of time, because they are events rather than contributors to the state, the asynchronous meeting system 100 according to this invention does not reconstruct the most recent text or sound events when recreating the state of the meeting. The asynchronous meeting system 100 according to this invention merely replays the text utterances 1005 and sounds that occur after the selected point.

Reconstructing the state requires reconstructing two different classes of events: events that update the state by replacing it, such as changing the room background of the virtual environment 1000, and events that contribute to the accumulated state, such as whiteboard strokes.

The events that update the state by replacing the state include prop presence, appearance, and movement; avatar presence, appearance, and movement; changing the room background of the virtual environment; and changing the contents of the browsers. For replacing events, the state is reconstructed by traversing the event history backwards until the asynchronous meeting system 100 according to this invention finds the most recent relevant replacing event. It is possible that the only relevant event may have occurred at the beginning of the meeting. In this case, the asynchronous meeting system 100 according to this invention may have to scan all the way back to the beginning of the meeting to restore the state at the desired resumption point.

For accumulating events, the state is reconstructed by traversing the event history from the beginning of the meeting and accumulating all of the relevant events, until the desired resumption point is reached.

For the most part, users see during playback what they would see if they were taking part in a "live" synchronous session with one exception. That exception is that some of the avatars 1010 are displayed using a "live" appearance, while other avatars 1010 are displayed using a "recorded" appearance. Preferably, this convention is used to indicate that the participants represented by the avatars 1010 displayed using the recorded appearance are not currently on-line, and that their interactions were recorded earlier. It should be appreciated that it is possible during a playback session that there may be both live appearance and recorded appearance versions of a user's avatar, indicating that that user is both currently present, and had earlier recorded interactions.

During replay of the meeting, a user may suspend playback at any point, and augment the meeting with his/her comments, drawings, etc. Events taking place during playback which augment the meeting are recorded in the same manner as events taking place during the initial session, with the exception of the numerical time stamps. The real time stamps continue to be recorded as the actual date and time that the events occurred. However, in contrast to the initial session, where events are given integer event time stamps, the augmented events taking place during playback are inserted into the original numerical order by taking the original event time stamp X and appending a period and an augmentation number Y to it. Thus, the augmentation number of an event following immediately after the playback event X is event X.1. The event and augment number X.Y of each subsequent augmenting event occurring before the next playback event is incremented by one from the event and augment number X.Y of the previously augmenting event. For example, if a user augments the meeting with three new events between playback events 3 and 4, those events will be given event time stamps 3.1, 3.2 and 3.3. Then, at the end of the playback session, all events, including those added during the playback session, are renumbered in order with integer event time stamps. The process may then be repeated for subsequent playback and augmentation sessions.

Figure 6:
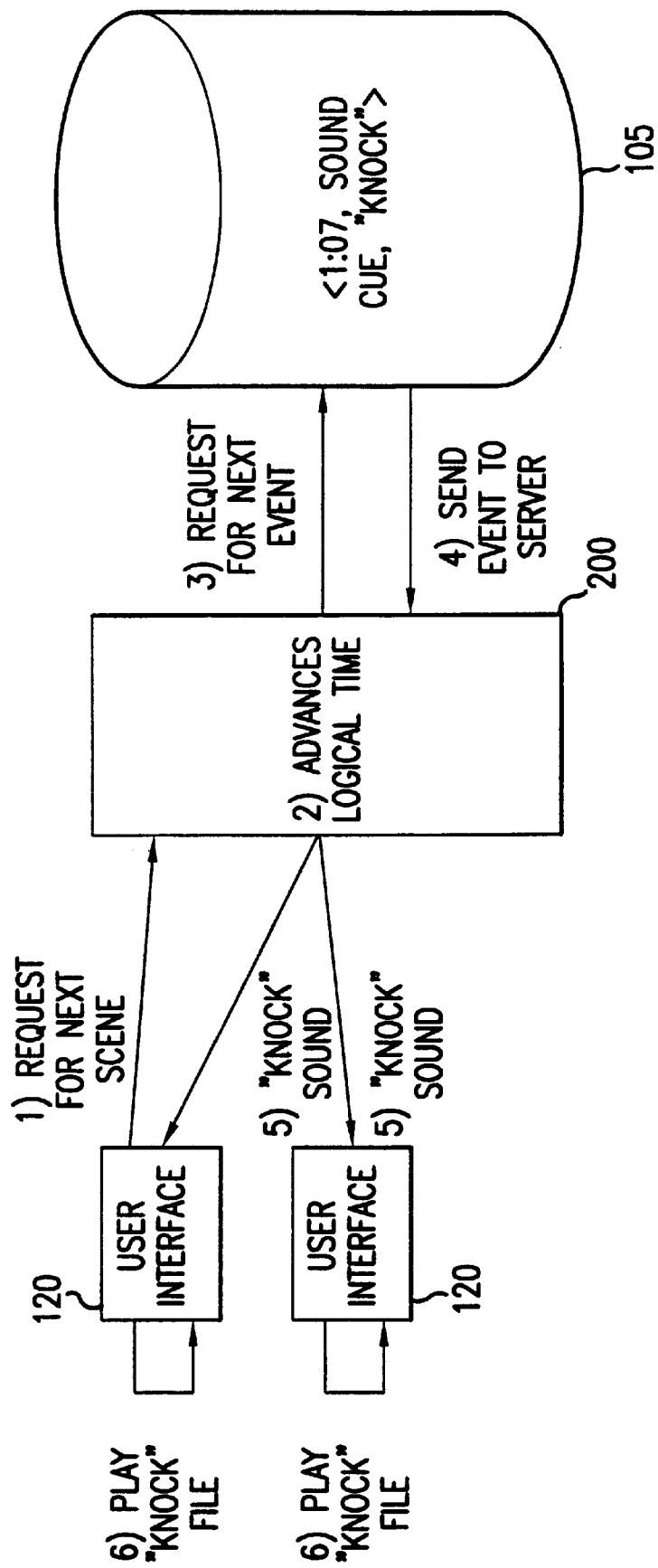
FIG. 6 is a functional block diagram illustrating how requests for next scene events are handled according to the asynchronous meeting system of this invention.
Figure 7:
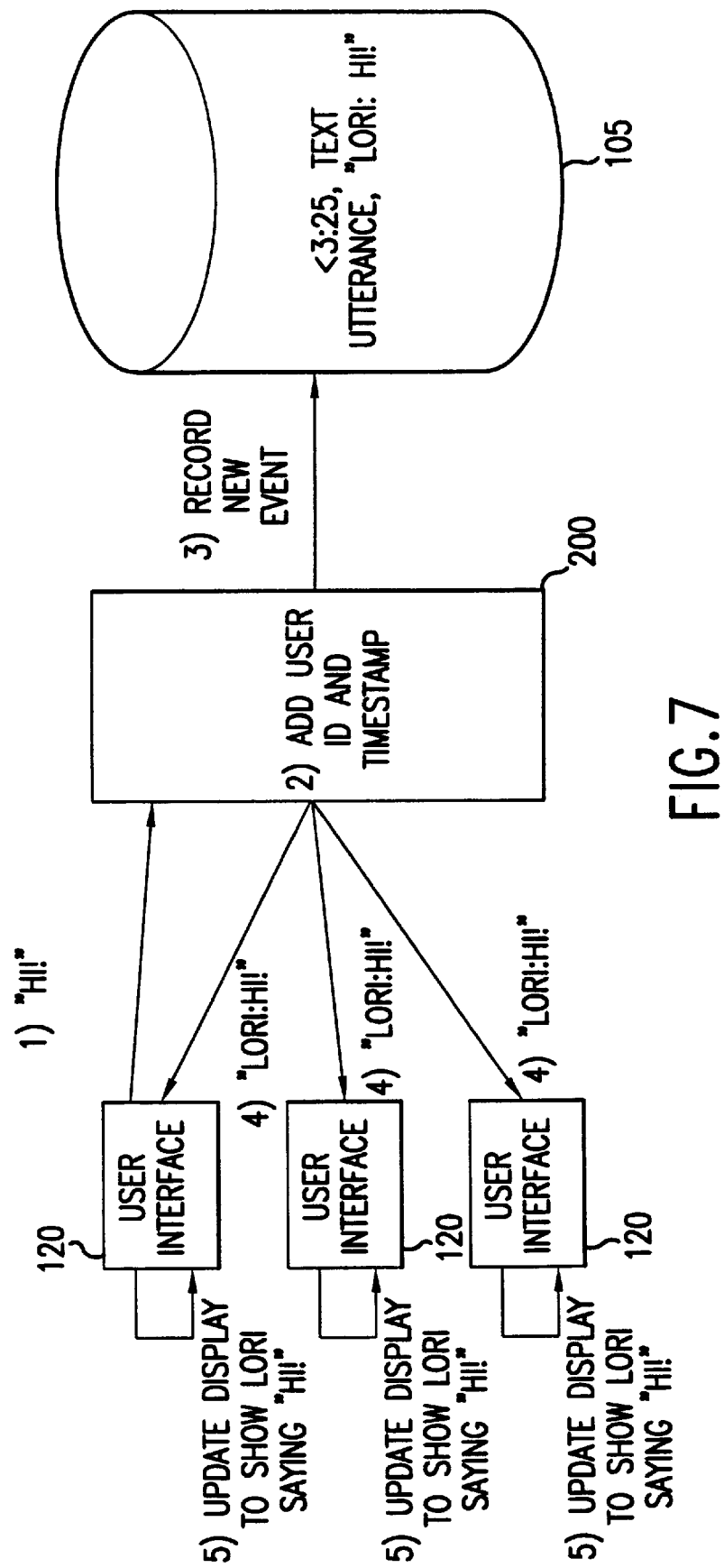
FIG. 7 is a functional block diagram illustrating how events are recorded and user displays updated according to the asynchronous meeting system of this invention.
Figure 8:
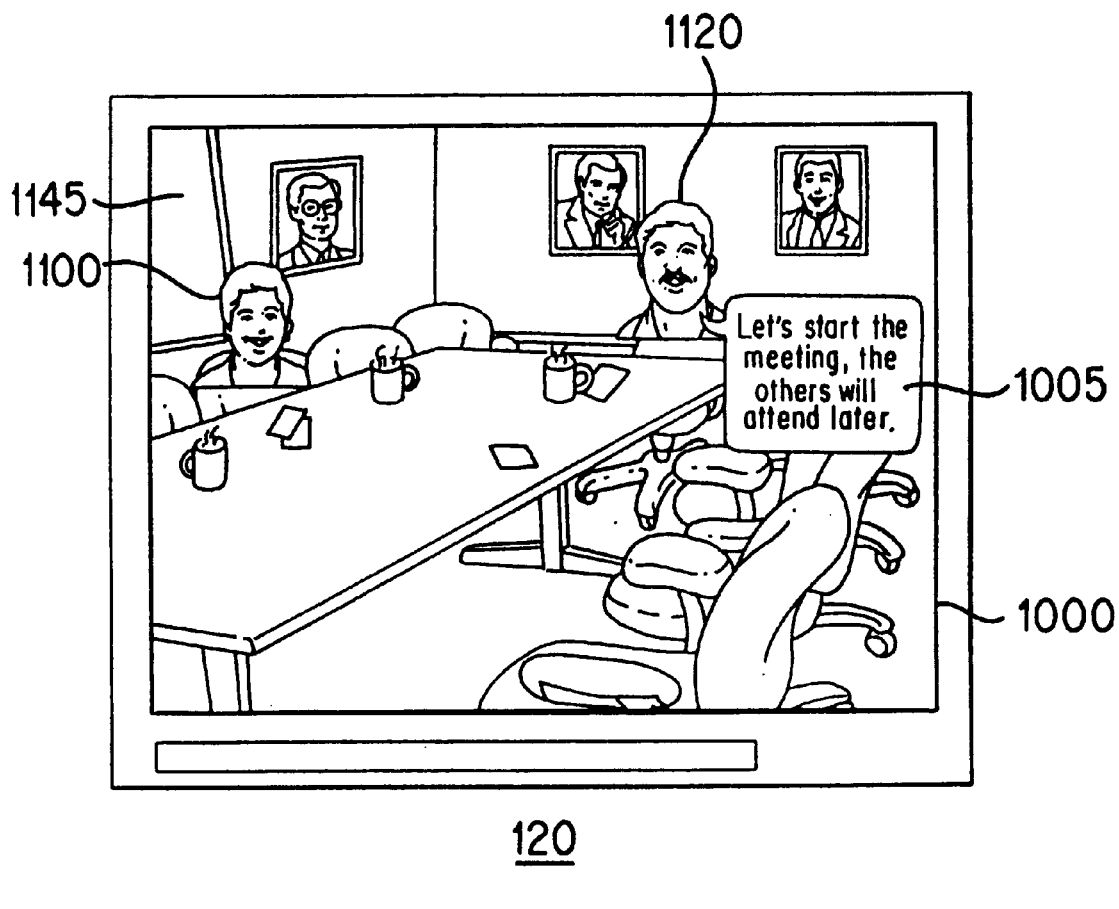
FIG. 8 is an exemplary graphical user interface screen of a virtual environment according to the asynchronous meeting system of this invention, illustrating the outset of a first instance of a meeting.
Figure 9:
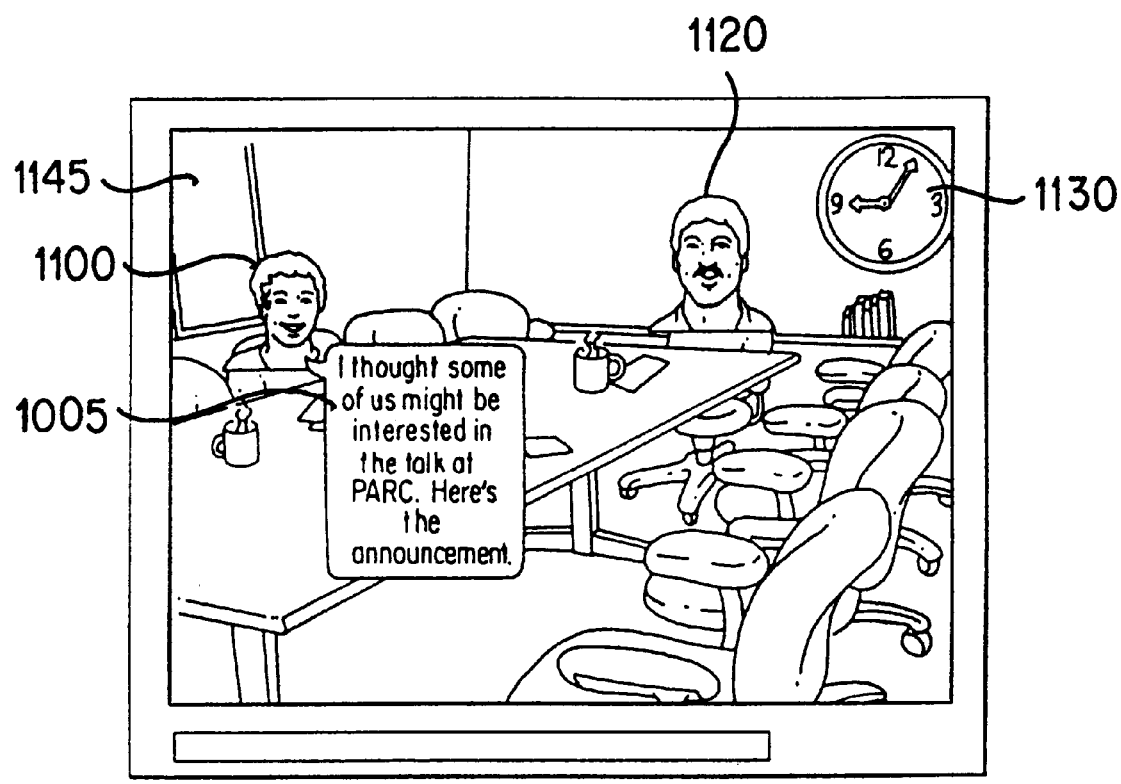
FIG. 9 is an exemplary graphical user interface screen of the virtual environment according to the asynchronous meeting system of this invention, illustrating a second event in accordance with the first instance of the meeting.
Figure 10:
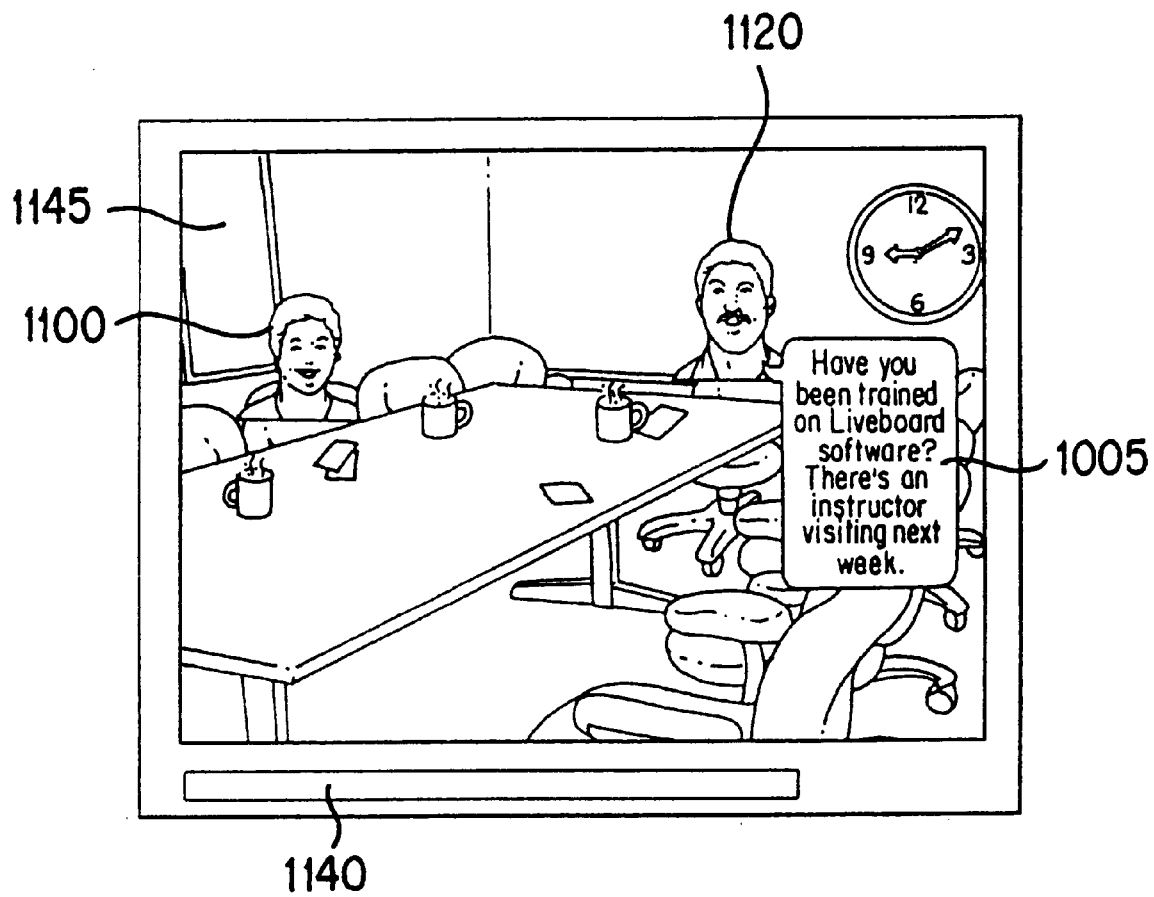
FIG. 10 is an exemplary graphical user interface screen of the virtual environment according to the asynchronous meeting system of this invention, illustrating a third event in accordance with the first instance of the meeting.
Figure 11:
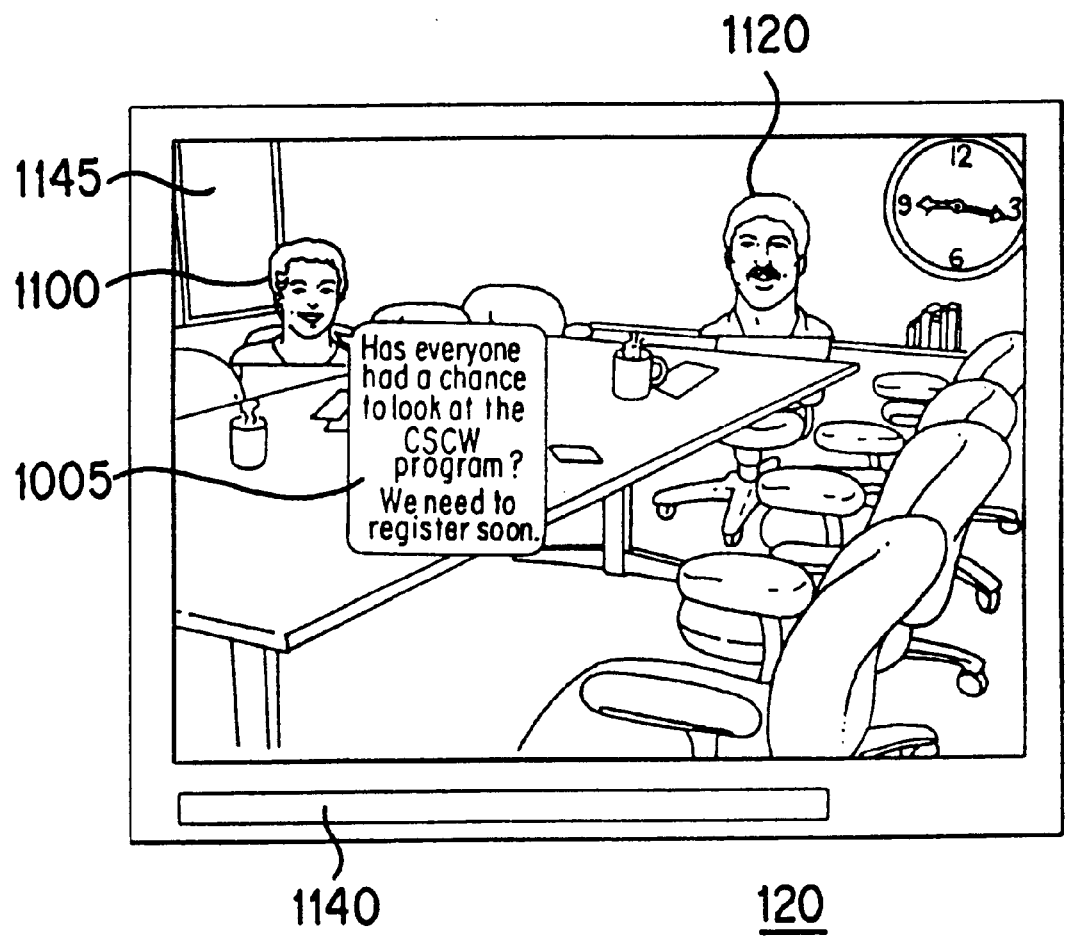
FIG. 11 is an exemplary graphical user interface screen of the virtual environment according to the asynchronous meeting system of this invention, illustrating a fourth event in accordance with the first instance of the meeting.

FIGS. 6 and 7 demonstrate how user events are recorded and displayed on other meeting participants' displays. Specifically, FIG. 6 outlines how a request for the next scene by a user is handled. At time 1, the user interface/display 120 sends a request for the next scene to the asynchronous meeting system 200. At time 2, the asynchronous meeting system 200 advances the logical time, and at time 3 sends a request for the next event to the multi-modal document 105. At time 4, the multi-modal document 105 sends the event to the asynchronous meeting system, which at time 5, distributes the event to each of the users, respectively. Then, at time 6, the individual user interfaces/displays play the "knock" file.

FIG. 7 outlines the recording of a new event. Specifically, at time 1, the input text string "Hi" is received from a user 120. At time 2, the user ID and time stamps are added to the text string by the asynchronous meeting system 200. At time 3, the new event is recorded in the multi-modal document 105. At time 4, the user ID and associated text string are distributed to each user interface 120 and, subsequently displayed.

FIGS. 8–11 show a series of graphical user interface screens displaying a virtual environment 1000 for a meeting having two meeting participants 1100 and 1120. As shown in FIGS. 8–11, the virtual environment 1000 is an exemplary picture of a meeting room. There are a number of props in the virtual environment 1000, including a clock 1130 that can be used later to chronologically order comments during playback. The meeting members are represented by the static photographic avatars 1100 and 1120. These avatars 1100 and 1120 are gesturally static but may be placed anywhere in the virtual environment 1000. In the preferred embodiment, to move the props, a user must select the desired prop and drag it to the new location. In contrast, in the preferred embodiment, to move the avatars 1100 or 1120, a particular user simply selects the location the user would like that user's avatar 1100 or 1120 to be placed within the room. In response, that user's avatar 1100 or 1120 is automatically placed at the selected location. Furthermore, there are certain "hot spots" in the virtual environment 1000. When an avatar is placed on one of these hot spots, the user is automatically transported into another virtual environment. In this example, a separate whiteboard virtual environment has been created. By placing one of the avatars 1100 or 1120 over the whiteboard prop 1145 at the left of the virtual environment 1000 shown in FIGS. 8–11, the whiteboard virtual environment can be entered. In the whiteboard room, all group members can draw illustrative diagrams and leave notes for each other. Since such items are persistent in this whiteboard virtual environment, it is possible for group members attending later to see and annotate anything on the whiteboard.

Users communicate and can control navigation within a meeting by typing text into the input area 1140 of the graphical user interface/display 120. A user selects and types into the text box 1140. If this text is a command, it is sent to the server; such commands are described below. If the text is dialogue, it will appear as "speech" in the form of a cartoon bubble 1005 adjacent to the corresponding avatar 1100 or 1120. The users are thus able to discuss issues in real time. An example of a log 1045, which can be viewed in a web browser with the associated links 1160, is shown in FIG. 12. It should be noted that the dialogue shown in FIG. 12 is from a different portion of the meeting than the portion of the meeting depicted in FIGS. 8–11. The log 1045 will be discussed below in greater detail in relation to navigation discussed hereinafter.

Exemplary commands that users may submit to the server to begin and end meetings, replay meetings, visit particular scenes, load a web browser, and load a summary of a meeting include: "NewMeeting", "EndMeeting", "ReplayMeeting", "LoadBrowser", "GotoScene" and "NextScene". In response to a "NewMeeting" command, the system responds by returning the name of the new meeting document. The user who issues this command is the moderator of the meeting. In response to an "EndMeeting" command, the system ends the current meeting. That is the system stops recording, and closes the document. In response to a "ReplayMeeting <name of meeting document>, 'logical' or 'chronological'" command the system responds by displaying the virtual environment in which the requested meeting began. In response to a "LoadBrowser, <URL>" command, a "LoadSoundClip, <file>" or "LoadVideoClip, <file>" the system responds by loading all participants' browsers with the specified URL, sound file or video file, respectively. In response to a "GotoScene <number>" command, the system responds by presenting the requested scene. That scene becomes the current scene. If no replay is in progress, this command has no effect. In response to a "NextScene" command the system responds by advancing to the next scene after the current scene. If a replay has just begun, "NextScene" command advances to the replay of Scene 1. If no replay is in progress, this command has no effect.

Figure 16:
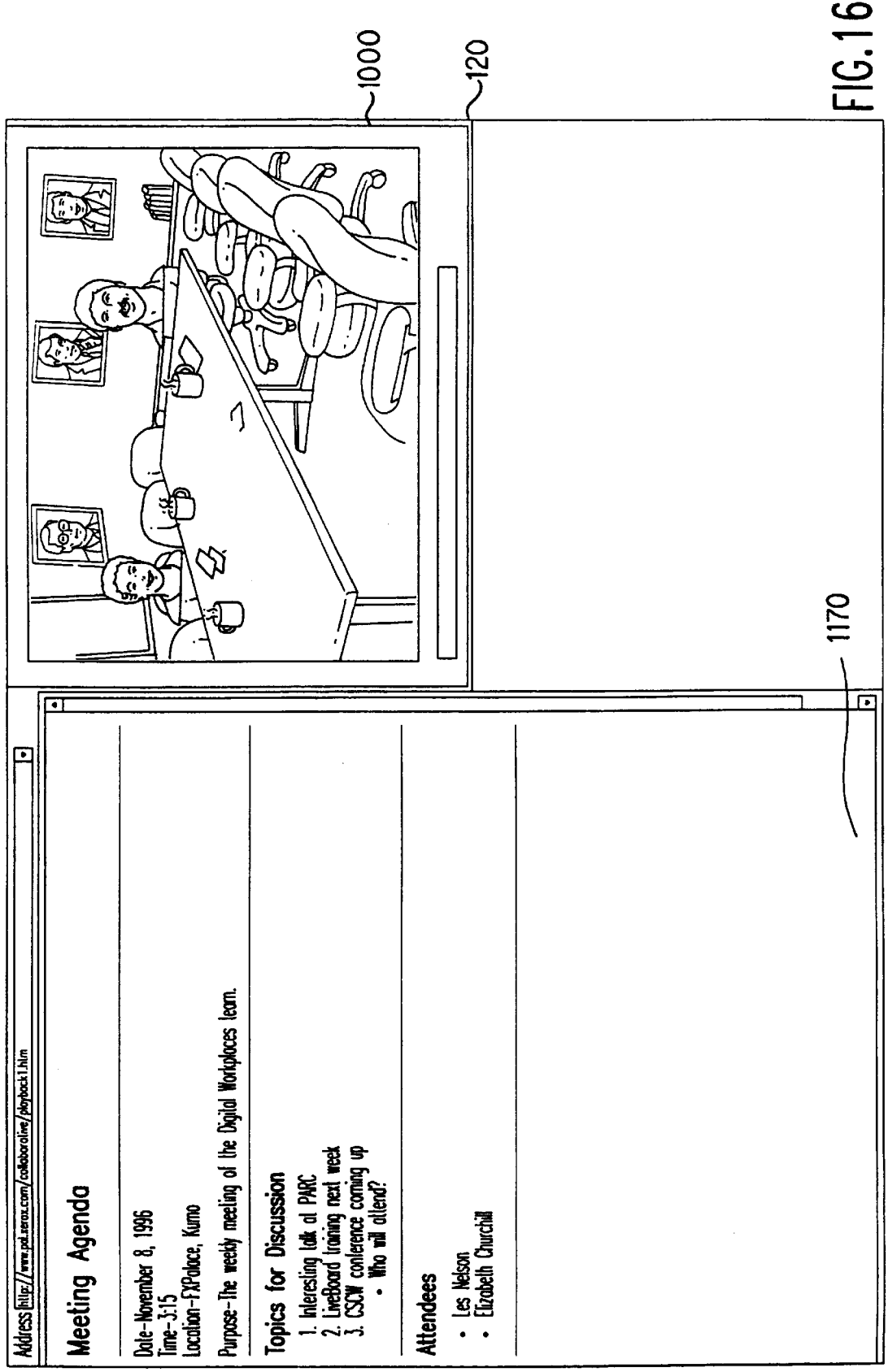
FIG. 16 is an exemplary graphical user interface screen displaying a representative user/moderator screen according to the asynchronous meeting system of this invention, displayed during the course of the first instance of the meeting.
Figure 17:
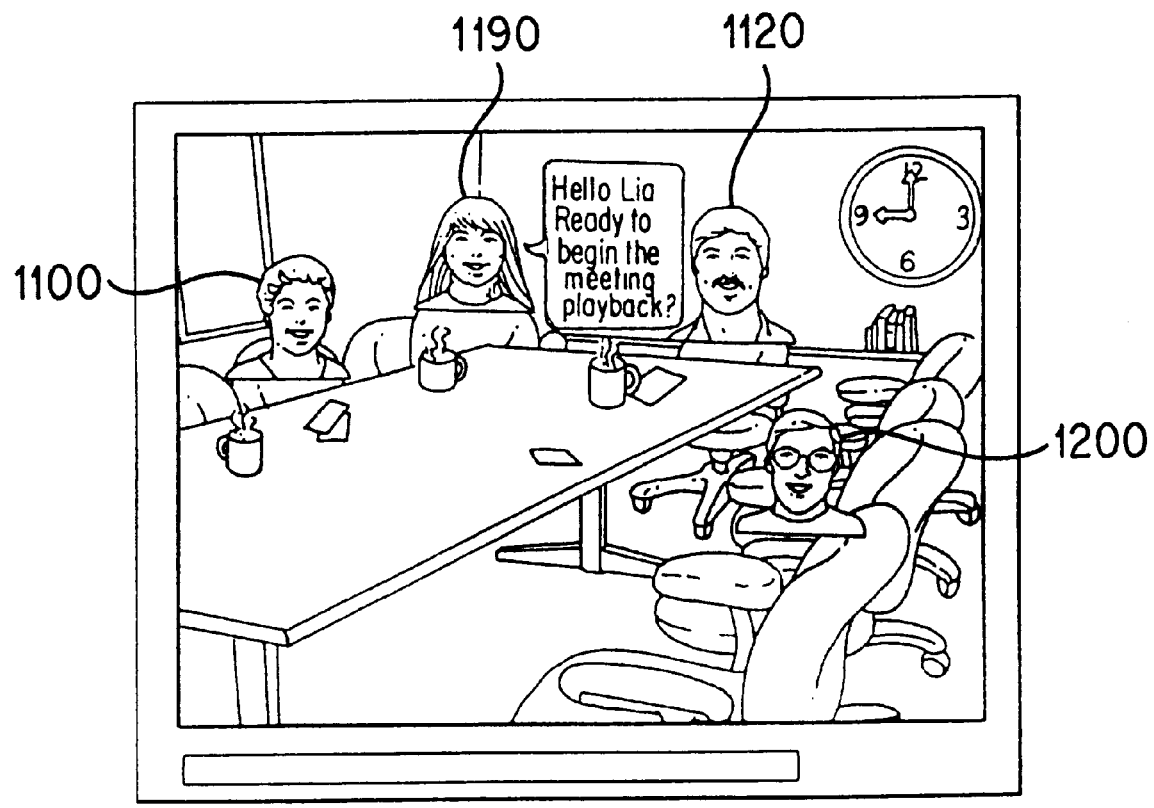
FIG. 17 is an exemplary graphical user interface screen of a virtual environment according to the asynchronous meeting system of this invention, illustrating the outset of a second instance of a meeting.
Figure 18:
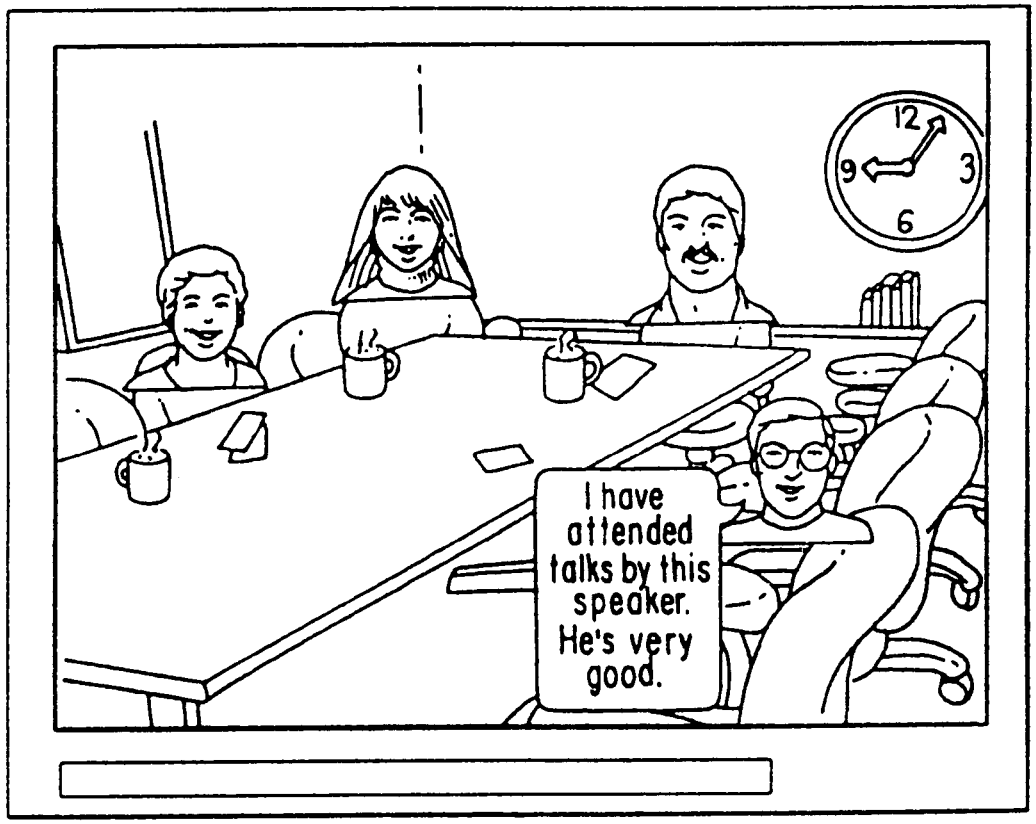
FIG. 18 is an exemplary graphical user interface screen of the virtual environment according to the asynchronous meeting system of this invention, illustrating a second event in accordance with the second instance of the meeting.
Figure 19:
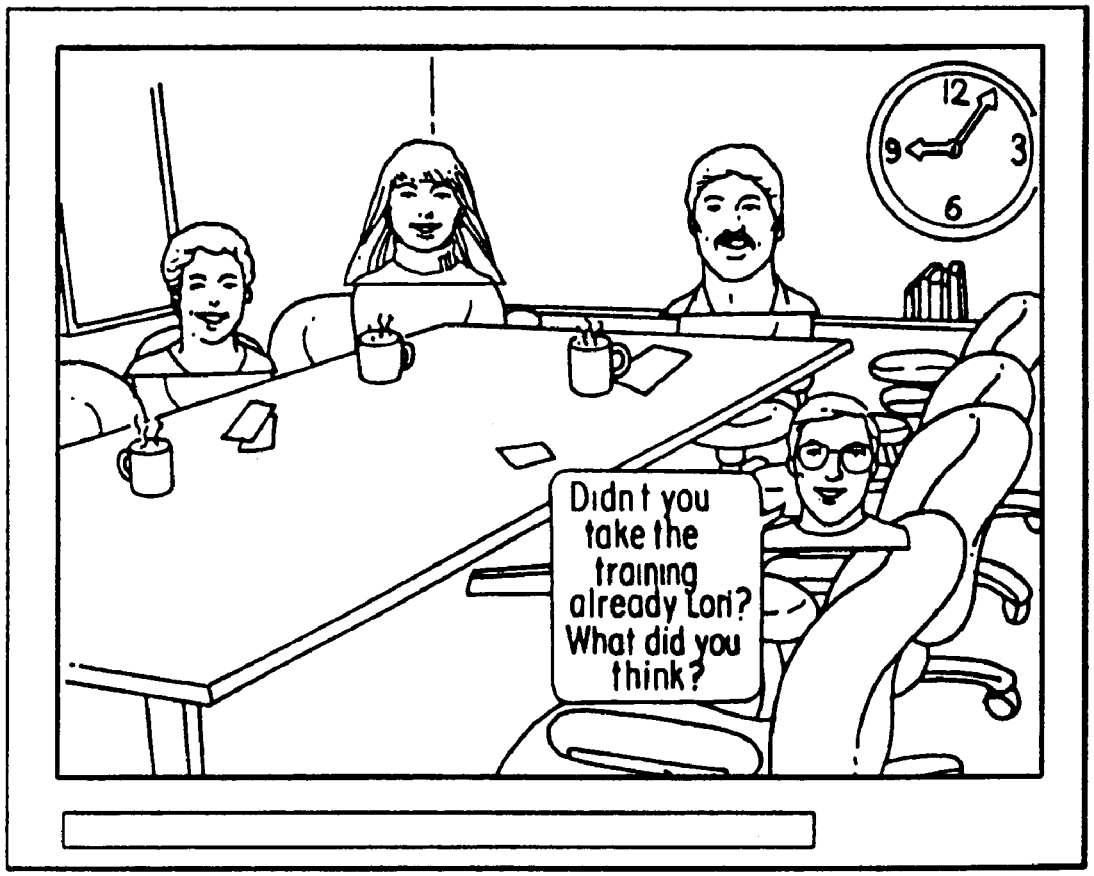
FIG. 19 is an exemplary graphical user interface screen of the virtual environment according to the asynchronous meeting system of this invention, illustrating a third event in accordance with the second instance of the meeting.
Figure 20:
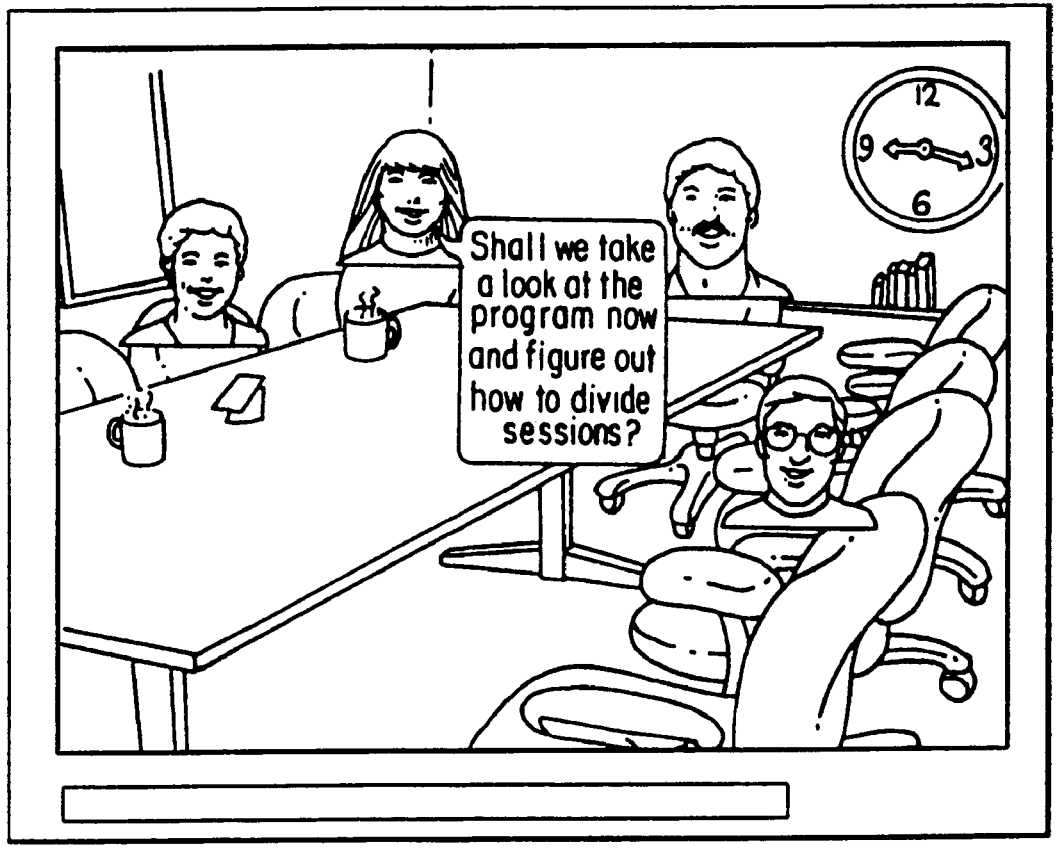
FIG. 20 is an exemplary graphical user interface screen of the virtual environment according to the asynchronous meeting system of this invention, illustrating a fourth event in accordance with the second instance of the meeting.

Furthermore, data can be retrieved from within this virtual space. In this illustrative example, FIGS. 13–15 show specific web pages relating to various topics. FIG. 13 shows the agenda for the meeting. One user, usually the person taking the role of moderator, steps through the agenda items. This agenda is used by the moderator to structure the meeting, in addition to offering a structure for later participants to follow during replay and augmentation. The asynchronous meeting system 100 according to this invention records and logs all activities. In the example meeting shown in FIGS. 8–11, a number of documents are introduced on topics of interest to the meeting's participants. These documents are shown in FIGS. 14 and 15. As shown in FIG. 16, when these documents are introduced, they can be seen by each of the meeting participants in a graphical user interface 1170 that appears next to the virtual environment 1000. By launching pages in this way, meeting participants can share information they have produced or external documents that are relevant to the meeting.

Figure 21:
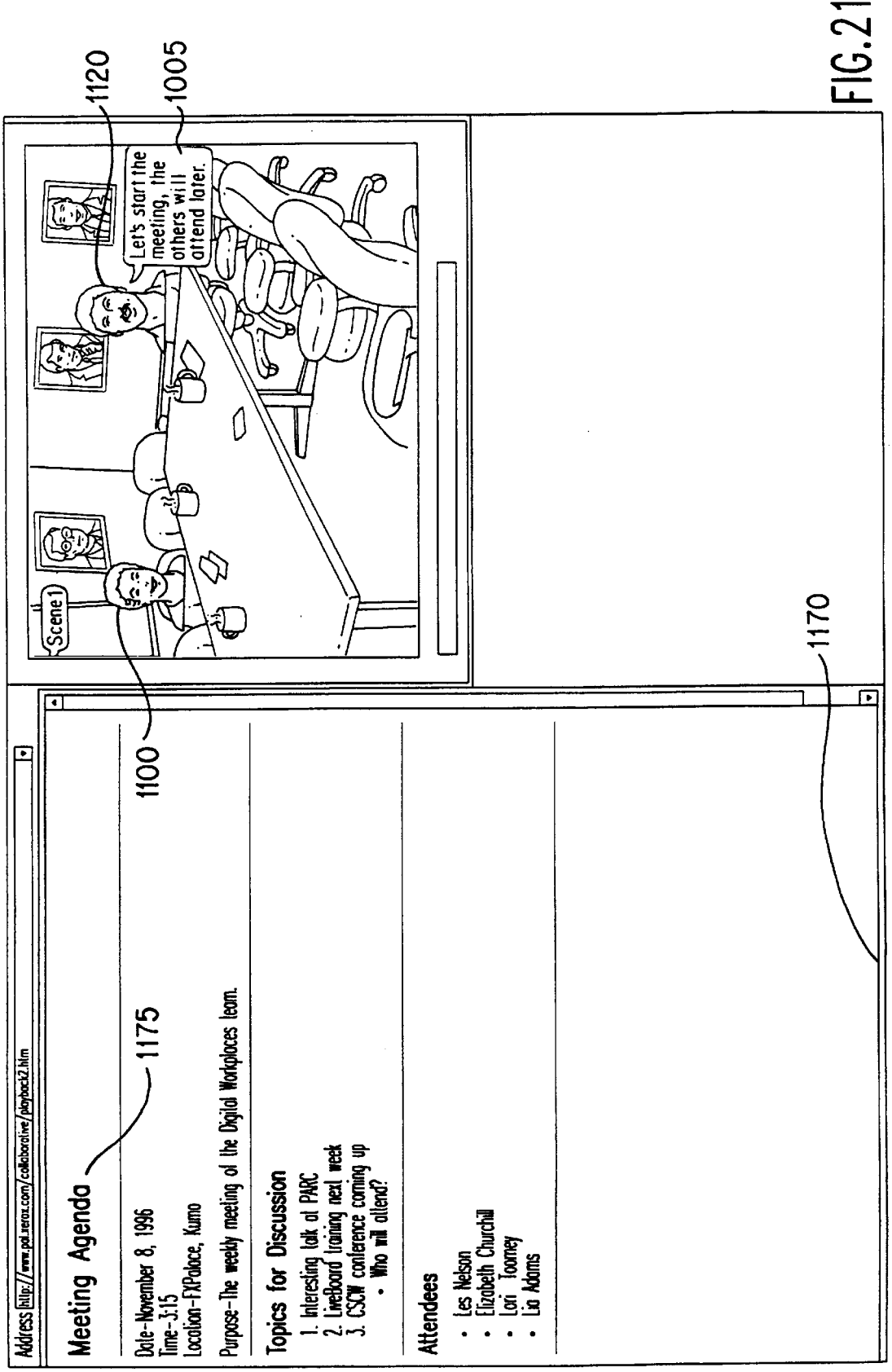
FIG. 21 is an exemplary graphical user interface screen displaying the representative user/moderator display according to the asynchronous meeting system of this invention during the course of the second instance of the meeting.

FIGS. 17–20 show a next set of interactions generated by subsequent participants to the meeting. Two new participants, represented by the avatars 1190 and 1200, are shown revisiting the earlier portion of the meeting to catch up on what has already been discussed. The avatars 1100 and 1120 that represent the previous participants are now shown using the recorded appearance, since these previous participants are not actually participating "on-line." FIG. 21 shows that the names of the new participants are added to the existing list on the agenda 1175 displayed in the window 1170. Each line of dialogue typed in the earlier meeting is replayed. The avatars 1100 and 1120 of the original speakers appear in the positions where their avatars 1100 or 1120 were when the particular avatar 1100 or 1120 'spoke' each text utterance 1005, but the avatars 1100 and 1120 are displayed using the recorded appearance, to distinguish the avatars 1100 and 1120 from the current, i.e., live, participants. The two current participants can interject remarks at any time during the replay, and the added remarks are added to the log 1045, where each remark is time stamped. As documents are introduced or updated in the earlier version of the meeting, the new participants' displays 120 display those documents. For example, in this scenario, as shown in FIG. 22, the agenda 1175 is updated to variously show the current item, to clarify old items, i.e., the time and place of a training class, and to show new information, i.e., such as the names of later participants. The updated information is shown using different appearances, such as color or the like, to indicate the updated information items are annotations and to indicate which participant made each updated information item.

Figure 32:
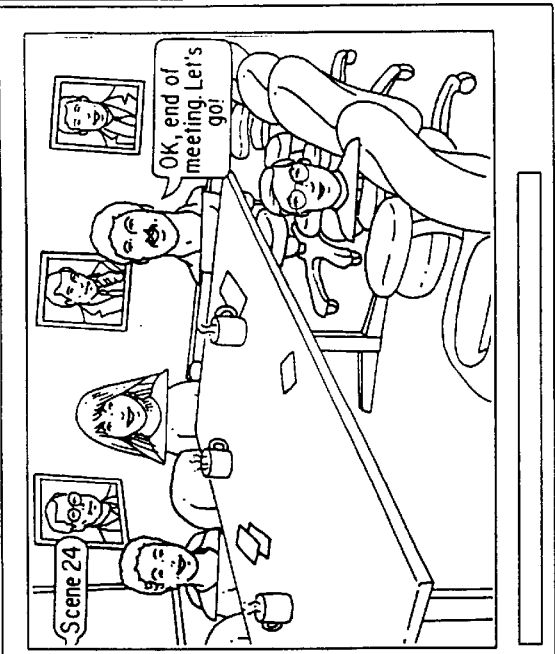

During the replay of the meeting, and specifically in FIG. 32, the agenda 1175 is updated to show that attendance at the CSCW conference has been agreed upon, and by the end of both parts of the meeting, the agenda document 1175 has been partly transformed into a record of the meeting activities. Some action items on the agenda 1175 are now assigned to particular people.

By keeping logs of all activities using version control, decisions can be unraveled to note all disagreements and how resolution was achieved. Furthermore, to facilitate later replay and augmentation, the asynchronous meeting system 100 according to this invention offers specific methods for accessing specific parts of the recorded meeting. The meeting itself, including all the dialogue and the supplementary material referenced during the meeting, defines the multi-modal document 105. The asynchronous meeting system 100 according to this invention offers participants a number of ways to access important parts of the recorded meeting document 105. These are a replay view, a text view, and a multi view.

The replay view allows replaying and annotating of the whole meeting by stepping through each scene. In the replay view, later participants view the dialogue in its original order, interject their own remarks, review and update auxiliary documents as they were introduced into the meeting, and create new documents at any point in the replayed time-stream. The replay view offers an opportunity for non-co-located group members to participate in a meeting with co-workers, experiencing the same graphical state of the virtual environment 1000, audio cues, and shared documents, as they would have had they originally attended the meeting synchronously with their co-workers.

The text view is the primary presentation of the meeting contents and the log 1045 of all text strings input into the virtual space. For each remark in the log, the text view, as shown in FIG. 12, shows the speaker 1220, the time stamp 1230, and the time-line number 1240 showing in which thread the remark was made. FIG. 12 shows a meeting happening on-line. The asynchronous meeting system 100 according to this invention defines the first interaction as time-line number 1 and each subsequent visit, by any user, defines the next higher time-line number.

The text view supports rapid scanning as it enables quick skimming of the text log 1045, as well as easy look ahead and backup searching for key words. The text view offers a quick way to peruse the text by skimming, navigation through key words searching and/or scrolling through the meeting document 105. From any line in the text view, the reader can follow links to the other documents that form the full meeting document. The other documents appear in the state they were in at the time the line of text was input. From this view, the viewer can navigate from the textual content of the meeting, i.e., the words of the participants, to the context, where context includes what words were already said, awareness of who was present at the meeting, and the state of shared artifacts. Therefore, the text view presents a fairly compact representation of a meeting, while allowing ready navigation to the richer media.

FIGS. 23–27 show the progression of a simple example meeting. Specifically, FIGS. 23–27 show the progression of an exemplary meeting in a first instance, i.e., the original recording of the meeting. FIGS. 28–32 show the exemplary meeting as it progresses through a second instance. That is in FIGS. 28–32, the original meeting has ended and subsequent attendees are reviewing and/or augmenting the previously recorded meeting.

Figure 23:
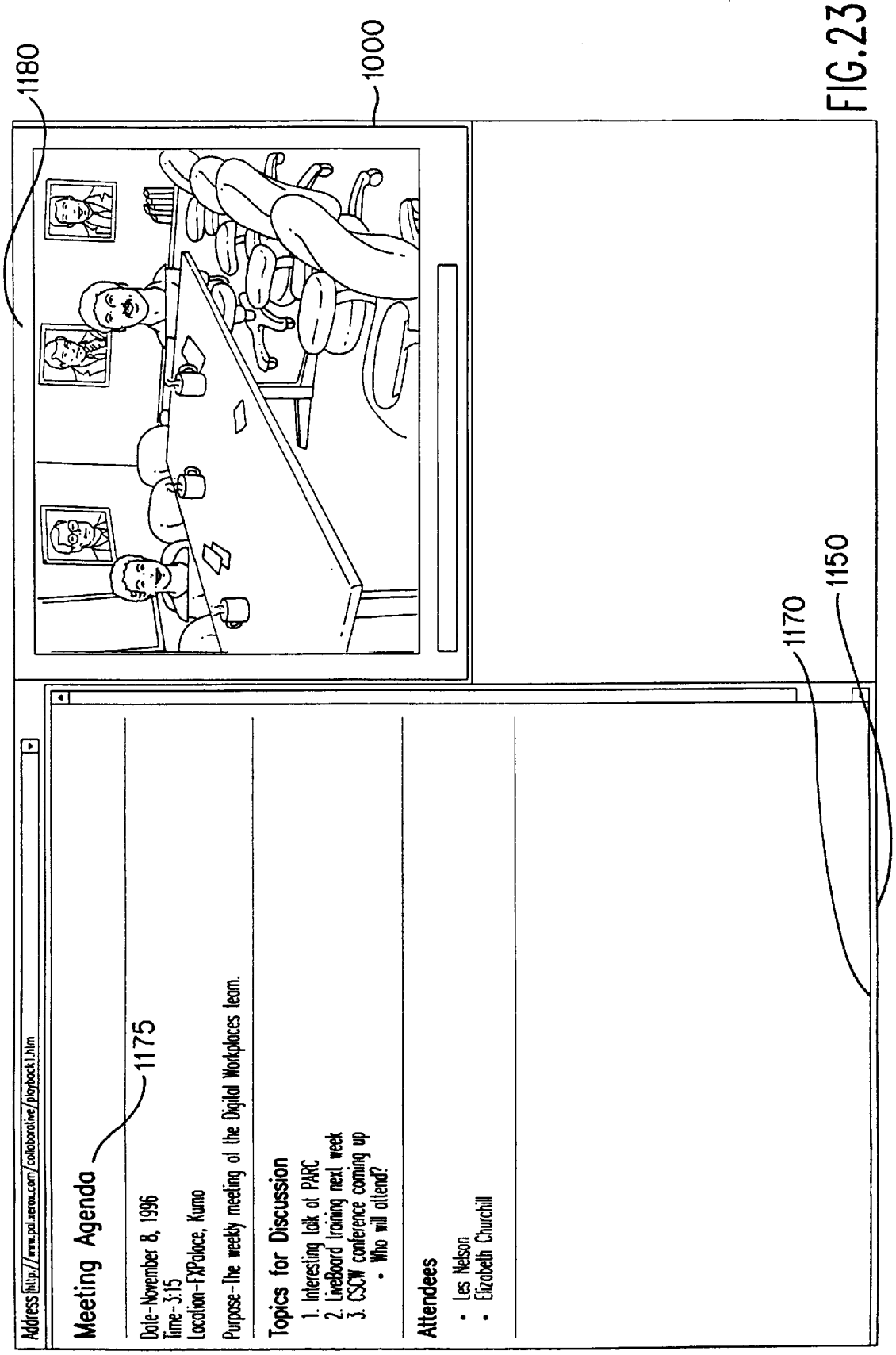
Figure 24:
Figure 25:
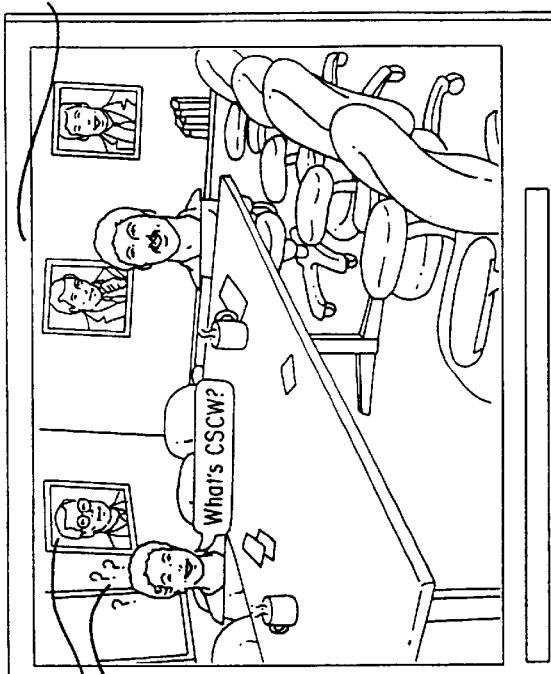
Figure 27:
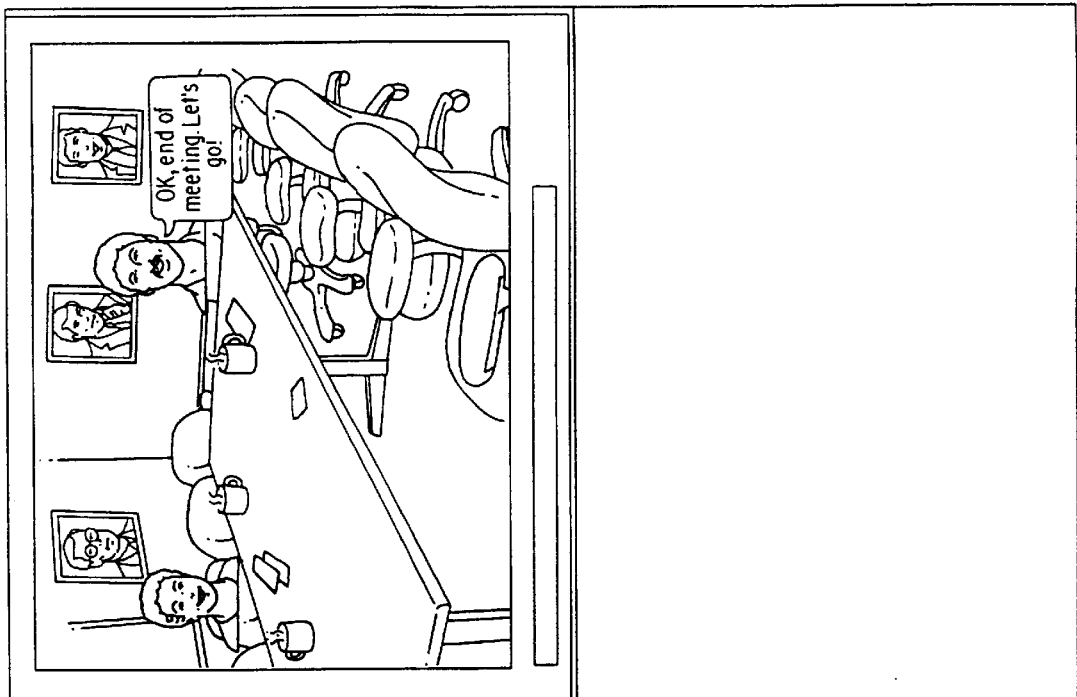
Figure 28:
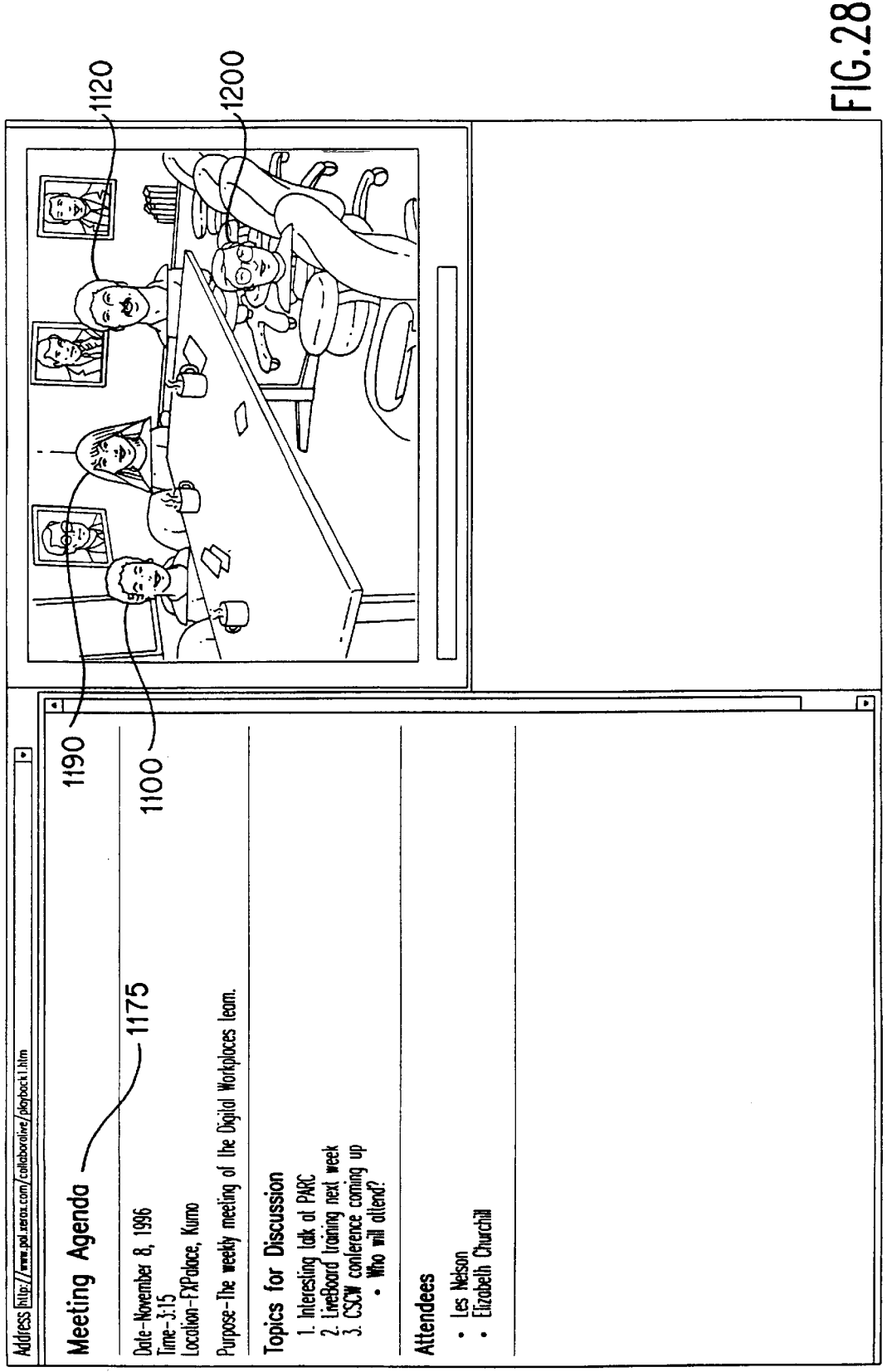
FIGS. 28–32 are further representative graphical user interface screens of the exemplary meeting displayed in accordance with the second instance of the meeting according to the asynchronous meeting system of this invention.

FIG. 23 illustrates what an individual's user display may look like. The meeting agenda 1175 is displayed in the graphical user interface window 1170 on the left side of the graphical user interface screen 1150, and the meeting virtual environment 1000 is displayed in the graphical user interface window 1180 positioned in the upper right hand portion of the graphical user interface 1150. Furthermore, the input text box 1140 through which participants enter text is displayed at the bottom of the virtual environment 1000. It is clear from FIG. 23 that two meeting participants will be participating in this first instance of the meeting. As the meeting begins in FIG. 24, a text utterance 1005 from one of the meeting participants can be seen. FIG. 25 is a snapshot of the midpoint of the meeting. As can be seen from the meeting agenda 1175, the meeting participants are currently on "Item 3" and the corresponding portion 1255 in the "Topics for Discussion" portion of the agenda 1175 is highlighted to indicate that it is the current topic being discussed. Furthermore, as shown in the graphical user interface window 1180, there are question marks 1040 above one user's avatar 1010. As discussed earlier, these question marks can be the result either of paint markings added to the graphical user interface 1180, or can represent a change in a user's avatar 1010 indicating an emotion.

Figure 26:
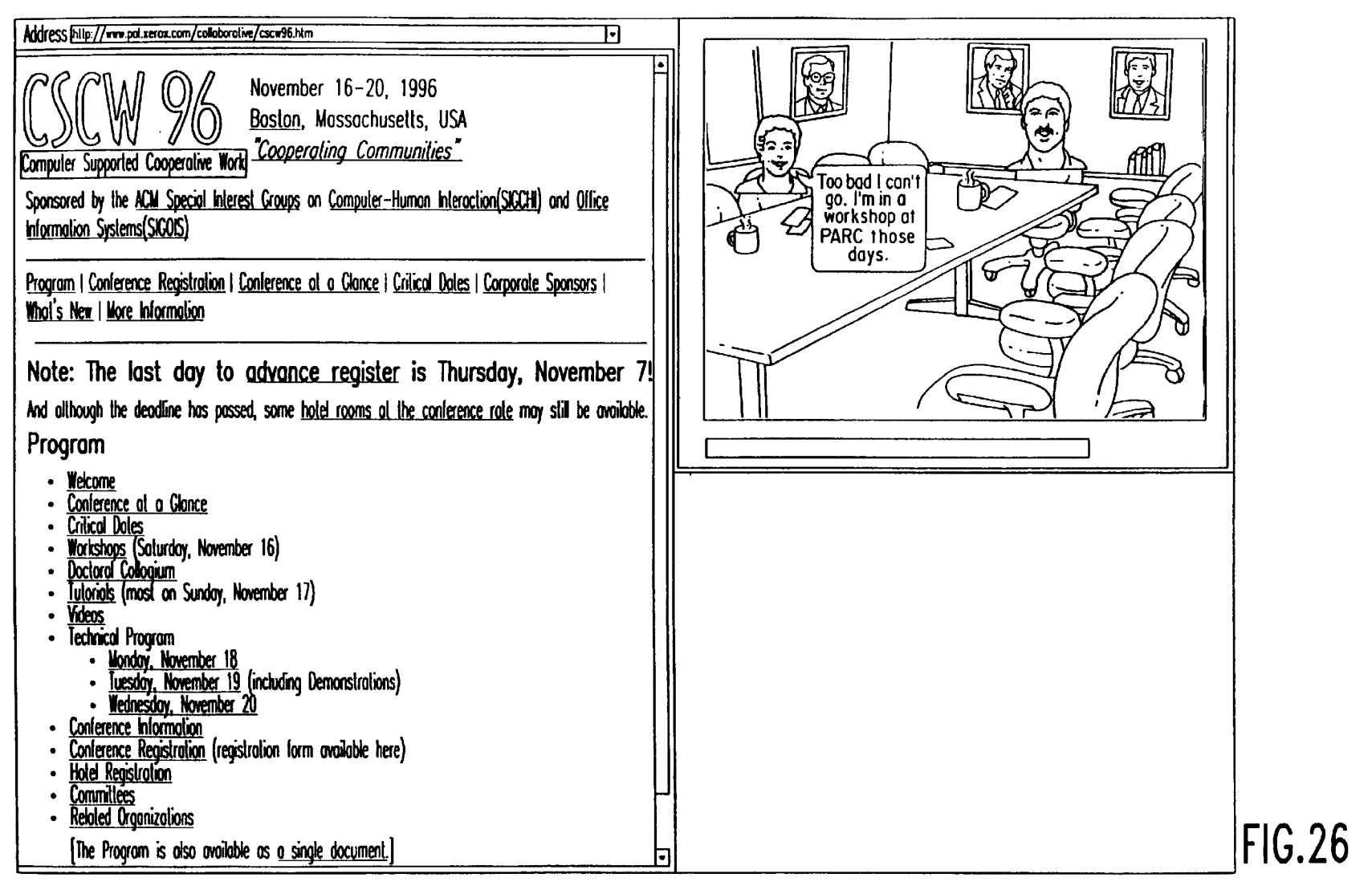

FIG. 26 is another representative snapshot of the same meeting at a later time. In FIG. 26, the left-hand side of the graphical user interface has been changed to display the program of the conference that was discussed earlier. Then, in FIG. 27, one participant indicates the meeting has come to an end.

Figure 29:
Figure 30:
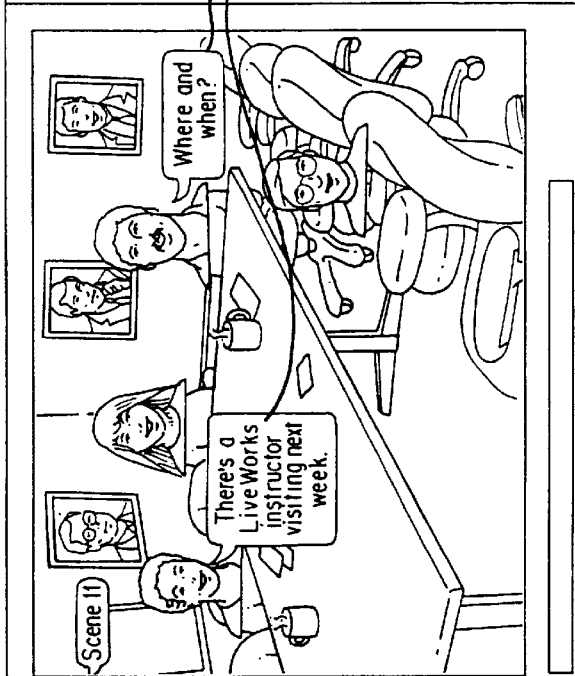
Figure 31:
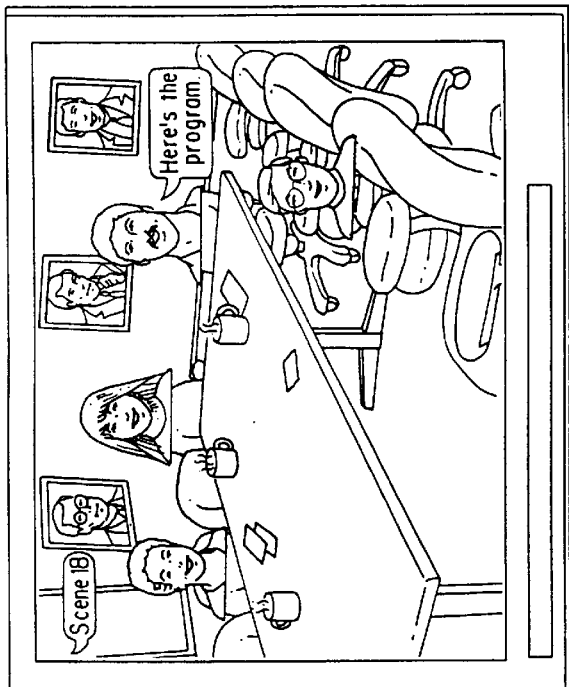

FIGS. 28–32 illustrate a second instance of the meeting where the two avatars 1100 and 1120 of the previous participants are now displayed using the recorded appearance and the avatars 1190 and 1200 of the new meeting participants are displayed using the live appearance. FIG. 29 shows the commencement of the second instance of the meeting. In particular, in FIG. 29, the number of attendees indicated in the meeting agenda 1175 has expanded from two to four. FIG. 30 is a snapshot of the meeting during the discussion of "Item 2" of the agenda 1175. It should be appreciated, as shown in FIG. 30, that simultaneous text bubbles 1260 from different participants can be displayed at the same time. FIG. 31 illustrates how the previously linked program is displayed for the new meeting participants. Furthermore, FIG. 32 illustrates how the topics for discussion in the meeting agenda progress as decisions are made and the meeting is concluded.

Figure 33:
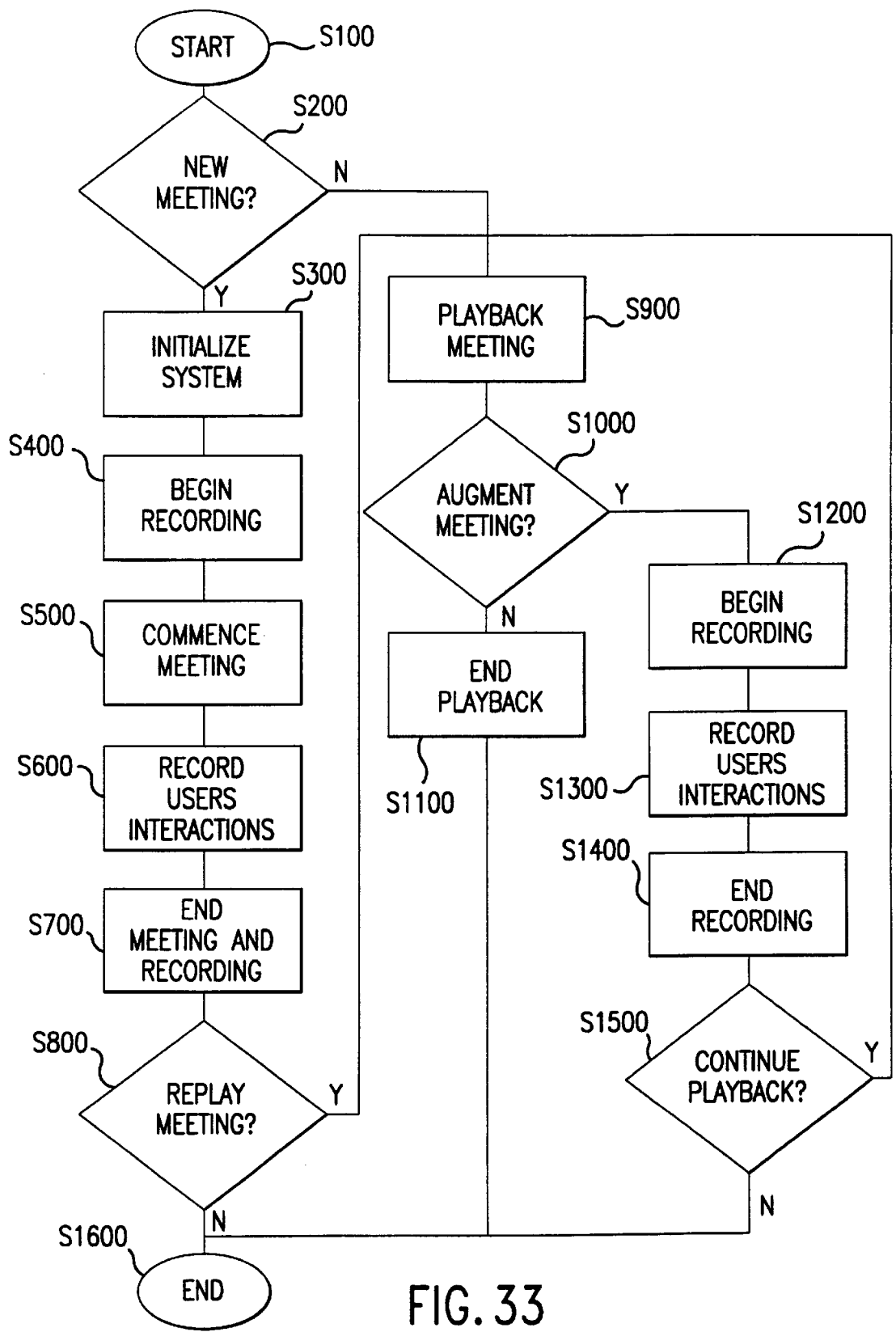
FIG. 33 is a flowchart illustrating the method according to the asynchronous meeting system of this invention.

FIG. 33 is a flowchart outlining how a multi-modal meeting is generated and asynchronously augmented. Beginning in step S100, control continues to step S200, where the system determines if the meeting is a new meeting. If so, control continues to step S300. Otherwise, control jumps to step S900.

In step S300, a moderator is determined and the asynchronous meeting system 100 according to this invention is initialized. Initialization includes establishing the virtual environment in which the meeting will take place and interconnecting all initial meeting participants. Next, in step S400, recording the multi-modal document begins. Then, in step S500, the meeting between the meeting participants commences. Control then continues to step S600.

In step S600, meeting participants' interactions are recorded and stored in the multi-modal document. As discussed earlier, these interactions can include text inputs, audio commands, graphics, whiteboard markings or any other recordable interaction that is necessary or desirable to provide a complete context of the meeting for subsequent participants. Next, in step S700, at the close of the meeting, recording is stopped. Then, in step S800, after completing the meeting, the meeting participants are queried as to whether they would like to replay the entire meeting or a portion of the meeting. If none of the participants elects to replay the meeting, control continues to step S1600. However, if one or more of the meeting participants elect to replay the meeting for review or further augmentation, control continues to step S900.

In step S900, the multi-modal document 105 is played back to the current meeting participants, who can be either the original meeting participants or subsequent participants. Next, in step S1000, the current meeting participants have the option of augmenting the previously-recorded multi-modal document. If one or more of the current meeting participants elects to augment the previously-recorded document, control jumps to step S1200. However, if none of the meeting participants elect to augment the meeting, control continues to step S1100. In step S1100, playing back the meeting is concluded and control jumps to step S1600.

In step S1200, recording of the current meeting participants' augmentations to the previously recorded document commences. Next, in step S1300, the meeting participants' interactions are inserted into the multi-modal document at a point that is chronological in the meeting to create a synchronous meeting. Then, in step S1400, when the one or more meeting participants are finished augmenting the previously recorded multi-modal document, recording ceases. Next, in step S1500, the one or more meeting participants may elect to continue playing back the previously recorded meeting or, if they have no further contributions, end playback of the meeting. If, in step S1500, the current meeting participants have finished reviewing the meeting, control continues to step S1600. Otherwise, if the meeting participants elect to continue playing back the meeting for further review or augmentation, control returns to step S900, where the playback and augmenting processes continues. In step S1600, the process ends.

Thus, it should be appreciated that the method for creating and asynchronously augmenting an asynchronous multi-modal document can be divided into three basic processes. The first process includes capturing the meeting into a multi-modal document. The second process includes replaying the meeting captured on the multi-modal document, and the third process includes augmenting the meeting captured on the multi-modal document to create a integrated recording of an activity for later review.

Although in the preferred embodiment, the illustrative system interacts with applications such as a web browser, the system could interact with other applications. For example, the system can send an e-mail message to an earlier participant of an asynchronous meeting when someone in a later session responds to a question that an earlier participant had posed. Furthermore, where a user has familiarity with the events, it may be possible to annotate the meeting without replaying a portion. Additionally, a word processor could be invoked to display a document instead of a web browser. The only requirement is that additional applications would need to have an interface allowing that application to communicate with the other applications.

As shown in FIGS. 1 and 2, the multi-modal asynchronous meeting system is preferably implemented either on a single programmed general purpose computer or separate programmed general purpose computers. However, the multi-modal asynchronous meeting device can also be implemented on one or more special purpose computers, programmed microprocessors or microcontrollers and peripheral integrated circuit elements, ASICs or other integrated circuits, digital signal processors, hardwired electronic or logic circuits such as a discrete element circuits, programmable devices such as PLDs, PLAs, FPGAs or PALs, or the like. In general, any device, which is capable of implementing a finite state machine that is in turn capable of implementing the flowchart shown in FIG. 33, can be used to implement one or more of the multi-modal asynchronous meeting devices.

Furthermore, the asynchronous meeting system can be implemented on a server or other node on a local area network, a wide area network, an intranet, the Internet or any other distributed network. Additionally, the virtual environment and avatars need not be limited to two-dimensional graphical representations. Three-dimensional avatars could provide greater realism. Finally, the link 130 can be a wired or wireless link to the asynchronous meeting system 200.

Finally, while meeting control is illustrated in relation to text commands entered into the text box 1140, it should be appreciated that all selectable elements, e.g., avatars, props etc., within the asynchronous meeting system are selectable and controllable at least by a mouse and/or a keyboard connected to the user interface 120, or any other controller used for graphical user interfaces. In addition, rather than a mouse or keyboard, another controllable selection device, such as a joystick, a track ball, a touch pad, light pen, a touch screen display or the like, can be used.

It is, therefore, apparent that there has been provided in accordance with the present invention a method and apparatus for multi-modal asynchronous meetings in a virtual space. While this invention has been described in conjunction with preferred embodiments thereof, it is evident that many alternatives, modifications, and variations shall be apparent to those skilled in the art. Accordingly, applicants intend to embrace all such alternatives, modifications or variations that fall within the sphere and scope of this invention.

What is claimed is:

1. A system for recording computer-mediated, multi-modal, asynchronous events in a virtual environment, comprising:
    a data structure stored in a memory, the data structure storing a synchronous multi-modal document capable of recording a description of the virtual environment and a plurality of aspects of each of a plurality of events occurring relative to the virtual environment and;
    a plurality of computing devices interconnected into a network, the data structure stored on a first one of the plurality of computing devices; and
    each of the remaining ones of the plurality of computing devices allowing communication between a user and the data structure;
    wherein the system allows each user to interact with the data structure to input at least one of the events into the synchronous multi-modal document, the synchronous multi-modal document subject to at least one asynchronous annotation by at least one user, the at least one asynchronous annotation being merged with the synchronous multi-modal document to generate an updated synchronous multi-modal document wherein at least one of the at least one asynchronous annotation appears to have been input synchronously.

2. The system of claim 1, wherein the updated synchronous multi-modal document can be further annotated and merged.

3. The system of claim 1, wherein the updated synchronous multi-modal document can be further reviewed by each user.

4. The system of claim 1, further comprising at least one data controller, the at least one data controller further comprises:
    a multi-mode capture controller allowing recording of each event in the multi-modal document;
    an augmentation controller allowing annotation to the synchronous multi-modal document; and
    a replay controller allowing replay of at least one event of synchronous multi-modal document to at least one user.

5. The system of claim 1, further comprising a system clock.

6. The system of claim 1, wherein each user is represented in the virtual environment by an avatar.

7. The system of claim 6, wherein the avatar is a graphical representation of the at least one user.

8. The system of claim 7, wherein the avatar can reflect the at least one user's interactions with the system.

9. The system of claim 1, further comprising a graphical description of the virtual environment.

10. The system of claim 1, wherein the virtual environment includes at least one prop locatable and movable within the virtual environment.

11. The system of claim 1, wherein the virtual environment includes links to other virtual environments.

12. The system of claim 1, wherein the virtual environment comprises a virtual space in which the events occur.

13. The system of claim 12, wherein the virtual space is a virtual meeting room.

14. The system of claim 1, wherein a text string input by a user is displayed as a text bubble in the virtual environment.

15. The system of claim 1, wherein the virtual environment further comprises at least one area for displaying information relating to the plurality of events.

16. The system of claim 1, wherein the virtual environment further comprises means for each user to enter commands to the system.

17. The system of claim 16, wherein the commands comprise begin recording, end recording, replay, load information, fast forward and rewind.

18. The system of claim 16, wherein the commands further comprise new meeting, goto, load information, playing audio and playing video.

19. A method for recording and annotating computer-mediated, multi-modal, asynchronous events occurring in a virtual environment, comprising:
    creating a data structure for storing events occurring in the virtual environment;
    recording a plurality of events occurring relative to the virtual environment in a synchronous multi-modal document using the data structure;
    inputting at least one asynchronous annotation; and
    re-ordering the at least one asynchronous annotation and the recorded events to create an updated synchronous multi-modal document wherein at least one of the at least one asynchronous annotation appears to have been input synchronously.

20. The method of claim 19, further comprising:
    inputting additional asynchronous annotations;
    re-ordering the additional asynchronous annotations and the events of the updated synchronous multi-modal document; and
    updating the updated synchronous multi-modal document.

21. The method according to claim 19, further comprising:
    monitoring the at least one asynchronous annotation; and
    updating at least one user interface based on each asynchronous annotation.

22. The method according to claim 19, further comprising replaying at least one event to at least one user via a user interface.

* * * * *